(12) United States Patent
Borowiec et al.

(10) Patent No.: US 12,552,730 B2
(45) Date of Patent: Feb. 17, 2026

(54) ENHANCED PRODUCTION OF LIGHTLY BRANCHED OLEFIN OLIGOMERS THROUGH OLEFIN OLIGOMERIZATION

(71) Applicant: ExxonMobil Chemical Patents Inc., Baytown, TX (US)

(72) Inventors: Anita Borowiec, Woluwe Saint Lambert (BE); Shiwen Li, Quaregnon (BE); Wenyih Lai, Bridgewater, NJ (US); Jocelyn Kowalski, Mullica Hill, NJ (US); Marcel Janssen, Kessel-Lo (BE); Travis Reine, Seabrook, TX (US); Luc Martens, Meise (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 114 days.

(21) Appl. No.: 18/558,329

(22) PCT Filed: May 3, 2022

(86) PCT No.: PCT/EP2022/061857
§ 371 (c)(1),
(2) Date: Oct. 31, 2023

(87) PCT Pub. No.: WO2022/233875
PCT Pub. Date: Nov. 10, 2022

(65) Prior Publication Data
US 2024/0239724 A1    Jul. 18, 2024

Related U.S. Application Data

(60) Provisional application No. 63/185,870, filed on May 7, 2021.

(51) Int. Cl.
*C07C 2/12* (2006.01)
*B01J 35/77* (2024.01)

(52) U.S. Cl.
CPC ............... *C07C 2/12* (2013.01); *B01J 35/77* (2024.01); *C07C 2529/06* (2013.01)

(58) Field of Classification Search
CPC ... C07C 2/12; C07C 2529/06; C07C 2529/76; C07C 2529/70; B01J 35/77;
(Continued)

(56) References Cited

U.S. PATENT DOCUMENTS

| 1,815,022 A | 7/1931 | Davis |
| 2,015,748 A | 10/1935 | Frolich |

(Continued)

FOREIGN PATENT DOCUMENTS

| WO | WO2003/082780 | 10/2003 |
| WO | WO2020/081208 | 4/2020 |

(Continued)

OTHER PUBLICATIONS

API Publication 1509; "Engine Oil Licensing and Certification System," Oct. 2023, 245 pages.

(Continued)

*Primary Examiner* — Ali Z Fadhel

(57) ABSTRACT

A feed mixture comprising at least one $C_3$ olefin and/or at least one $C_4$ olefin may be contacted with a zeolite catalyst under oligomerization reaction conditions to form a product mixture comprising a plurality of olefin oligomers. The zeolite catalyst, optionally with one or more further modifications, may be selected for operability at high WHSV values that may produce at least $C_{12}$ olefins in the product mixture having an average branching index of about 2.2 or less. Under suitable conditions, $C_{10}$-$C_{13}$ olefins may comprise at least about 25% of the product mixture, M based on total olefin oligomers. Percentage conversion of the at least one $C_3$ olefin and/or at least one $C_4$ olefin may impact the average branching index of at least $C_{12}$ olefin oligomers and (Continued)

selectivity for $C_{10}$-$C_{13}$ olefin oligomers. An amount of $C_4$ olefin in the feed mixture may produce a targeted selectivity for at least $C_1$ olefins.

17 Claims, 13 Drawing Sheets

(58) Field of Classification Search
CPC ............... B01J 2229/36; B01J 2229/37; B01J 29/7046; B01J 29/7096; B01J 29/7692; C10G 50/00
See application file for complete search history.

(56) References Cited

U.S. PATENT DOCUMENTS

| | | |
|---|---|---|
| 2,191,498 A | 2/1940 | Rieff |
| 2,387,501 A | 10/1945 | Dietrich |
| 2,655,479 A | 10/1953 | Munday et al. |
| 2,666,746 A | 1/1954 | Munday et al. |
| 2,721,877 A | 10/1955 | Popkin et al. |
| 2,721,878 A | 10/1955 | Popkin |
| 3,197,405 A | 7/1965 | LeSuer |
| 3,250,715 A | 5/1966 | Wyman |
| 3,354,078 A | 11/1967 | Miale et al. |
| 4,076,842 A | 2/1978 | Plank et al. |
| 4,827,064 A | 5/1989 | Wu |
| 4,827,073 A | 5/1989 | Wu |
| 4,956,122 A | 9/1990 | Watts et al. |
| 5,332,566 A | 7/1994 | Moini |
| 6,080,301 A | 6/2000 | Berlowitz et al. |
| 6,090,989 A | 7/2000 | Trewella et al. |
| 6,165,949 A | 12/2000 | Berlowitz et al. |
| 7,425,662 B2 | 9/2008 | Stanat et al. |
| 7,704,930 B2 | 4/2010 | Deckman et al. |
| 7,759,533 B2 | 7/2010 | Cheng et al. |
| 8,500,991 B2 | 8/2013 | Lai et al. |
| 9,278,893 B2 | 3/2016 | Nicholas et al. |
| 9,441,173 B2 | 9/2016 | Nicholas et al. |
| 2009/0312583 A1* | 12/2009 | Sigl .................... C07C 45/50 585/326 |
| 2011/0282120 A1* | 11/2011 | Buchanan ............... C07C 37/08 585/329 |
| 2014/0135552 A1* | 5/2014 | Nicholas ............... C10G 57/005 585/532 |
| 2015/0166432 A1* | 6/2015 | Krupa .................... C10G 50/00 585/329 |
| 2016/0312133 A1 | 10/2016 | Nicholas et al. |
| 2020/0102256 A1* | 4/2020 | de Smit .................... C07C 2/12 |
| 2024/0217896 A1 | 7/2024 | Li et al. |
| 2024/0228411 A1 | 7/2024 | Li et al. |
| 2024/0239729 A1 | 7/2024 | Varga et al. |

FOREIGN PATENT DOCUMENTS

| | | |
|---|---|---|
| WO | WO2020/081210 | 4/2020 |
| WO | WO2020/081212 | 4/2020 |

OTHER PUBLICATIONS

Burton, A. W. et al. (2009) "On the Estimation of Average Crystallite Size of Zeolites from the Scherrer Equation: A Critical Evaluation of its Application to Zeolites with One-Dimensional Pore Systems," *Microporous and Mesoporous Materials*, v.117, pp. 75-90.

Miale, J. N. et al. (1966) "Catalysis by Crystalline Aluminosilicates: IV. Attainable Catalytic Cracking Rate Constants, and Superactivity," *Journal of Catalysis*, v.6(2), pp. 278-287.

Olson, D. H. et al. (1980) "Chemical and Physical Properties of the ZSM-5 Substitutional Series," *Journal of Catalysis*, v.61(2), pp. 390-396.

Patterson, A.L. (1939) "The Scherrer Formula for X-Ray Particle Size Determination," Physical Review, v.56, pp. 978-982 citing Scherrer, P. (1918) "Estimation of the Size and Internal Structure of Colloidal Particles by Means of Röntgen," *Nachrichten von der Gesellschaft der Wissenschaften zu Göttingen*, 2, pp. 96-100.

Weisz, P. et al. (1965) "Superactive Crystalline Aluminosilicate Hydrocarbon Catalysts," *Journal of Catalysis*, v.4(4), pp. 527-529.

Shultz, H. et al. (1968) "Institute of Gas Technology, Combustion Technology and Water Chemistry, University of Karlsruhe," *Chromatographia*, v.1, 1968, pp. 316-326.

* cited by examiner

ENHANCED PRODUCTION OF LIGHTLY BRANCHED OLEFIN OLIGOMERS THROUGH OLEFIN OLIGOMERIZATION

CROSS-REFERENCE TO RELATED APPLICATIONS

This application is a National Phase Application claiming priority to PCT Application Serial No. PCT/EP2022/061857 filed May 3, 2022, which claims the priority benefit of U.S. Provisional Patent Application No. 63/185,870 filed on 7 May 2021 titled "Enhanced Production of Lightly Branched Olefin Oligomers Through Olefin Oligomerization" which is incorporated herein by reference in its entirety. This application is related to U.S. Provisional Application No. 63/185,903 filed 7 May 2021 titled, "Enhanced Production of Lightly Branched Olefin Oligomers Through Olefin Oligomerization", U.S. Provisional Application No. 63/185,932 filed 7 May 2021 titled "Functionalization of Lightly Branched Olefin Oligomers" and U.S. Provisional Application No. 63/185,952 filed 7 May 2021 titled "Functionalization of Lightly Branched Olefin Oligomers".

FIELD

The present disclosure relates to olefin oligomerization under conditions suitable to form olefin oligomers having a limited extent of branching.

BACKGROUND

The condensation of an olefin or mixture of olefins to form higher molecular weight products is widely known and practiced. The condensation reaction or process is referred to herein as "oligomerization," and the condensation products (oligomerization products) are low molecular weight olefin oligomers formed through condensation of up to about 12 olefin molecules with each other (typically 2, 3 or 4, but up to 5, 6, 7, or even 8 olefin molecules may react to form oligomers smaller than 12-mers). A double bond is retained in the olefin oligomers, which may undergo subsequent hydrogenation to form a paraffinic product or functionalization to form a functionalized product, such as a surfactant or similar amphiphilic compound, sometimes over multiple functionalization steps. Oligomerization of low molecular weight olefins (e.g., ethylene, propene, 1-butene, 2-butene, isobutene, 1-pentene, 1-hexene, 1-octene and the like) may be conducted in the presence of a solid acid catalyst. The choice of the acid catalyst, the identity of the olefin(s) undergoing oligomerization, and the oligomerization reaction conditions may impact the product distribution, including both the size and type of olefin oligomers formed and the extent of branching therein.

A number of solid acid catalysts may be employed when conducting olefin oligomerization, both in tubular and chambered reactors. Suitable solid acid catalysts include, for example, solid phosphoric acid catalysts and molecular sieve catalysts (e.g., a zeolite catalyst). With solid phosphoric acid catalysts, pressure drop over the catalyst bed(s) may increase gradually over the duration of a run, presumably due to coking and/or swelling of the catalyst pellets, with the run being terminated when a maximum allowable pressure drop is reached. Molecular sieve catalysts do not typically show increased pressure drop over a run and may afford longer run lengths, in which case catalyst replacement may take place when selectivity and/or activity has dropped to an unacceptable level.

U.S. Pat. Nos. 9,441,173 and 9,278,893 and US Patent Application Publication 2016/0312133 describe the use of zeolite catalysts for production of diesel, gasoline, and jet fuel hydrocarbons, respectively. U.S. Pat. No. 7,425,662 and International Patent Application Publication WO 2003/082780, for example, describe the use of ZSM-22 and ZSM-23 zeolite catalysts that have been treated with a bulky amine to enhance product selectivity during olefin oligomerization. Since the amine is essentially chemisorbed to acidic sites of the zeolite catalyst, the amines may desorb during a run and lead to decreased selectivity and poorer product purity. International Patent Application Publications WO 2020/081208, WO 2020/081210, and WO 2020/081212 describe the use of zeolite catalysts that have not been modified with an amine for production of olefin oligomers having a limited extent of branching.

The product distribution obtained through olefin oligomerization may include dimers, trimers, tetramers and higher olefin oligomers, each of which themselves may comprise a mixture of skeletal isomers and/or positional isomers for the double bond location. Classes of olefins obtainable through olefin oligomerization are outlined below, wherein R is a hydrocarbyl group, such as an alkyl group, and each R may be the same or different in olefin oligomers having multiple occurrences of R.

Type I: $RCH=CH_2$, monosubstituted
Type II: $RCH=CHR$, disubstituted (cis or trans)
Type III: $RRC=CH_2$, disubstituted
Type IV: $RRC=CHR$, trisubstituted
Type V: $RRC=CRR$, tetrasubstituted Type I olefins are sometimes referred to as α- or vinyl olefins, and Type III olefins are sometimes referred to as vinylidene olefins. Type IV olefins are sometimes further subdivided into Type IVA, in which access to the double bond is less hindered, and Type IVB, in which access to the double bond is more hindered.

The extent of branching and the double bond position may significantly impact the properties and performance of olefin oligomers and products obtained therefrom. As non-limiting examples, these structural features may impact properties such as pour point, volatility, biodegradability, solubility, surfactant properties, and propensity toward undergoing further alkylation and/or oxidation, both for the olefins themselves and products obtained therefrom. Type I olefins, in particular, may be more reactive and biodegradable than are the other classes of olefins.

SUMMARY

In some embodiments, the present disclosure provides olefin oligomerization methods comprising: contacting a feed mixture comprising at least one $C_3$ olefin and/or at least one $C_4$ olefin with a zeolite catalyst under oligomerization reaction conditions effective to form a product mixture comprising a plurality of olefin oligomers; wherein an average branching index of $C_{12}$ olefin oligomers and a selectivity for $C_{10}$-$C_{13}$ olefin oligomers within the plurality of olefin oligomers are correlated to one another as a function of percentage of conversion of the at least one $C_3$ olefin and/or at the least one $C_4$ olefin; specifying a targeted average branching index of $C_{12}$ olefin oligomers and/or a targeted selectivity for $C_{10}$-$C_{13}$ olefin oligomers; and selecting at least one of a weight hour space velocity (WHSV) and a temperature sufficient to achieve a percentage of conversion of the at least one $C_3$ olefin and/or at the least one $C_4$ olefin to afford the targeted average branching index of $C_{12}$ olefin oligomers and/or the targeted selectivity for $C_{10}$-$C_{13}$ olefin oligomers.

In some embodiments, the present disclosure provides compositions comprising at least $C_{12}$ olefin oligomers. The compositions comprise: a plurality of olefin oligomers comprising at least $C_{12}$ olefin oligomers, the olefin oligomers a) comprising one or more oligomers having about 8 to about 24 carbon atoms and at least about 70 wt. % Type II and Type IV olefins in total; wherein an average number of methyl branches per carbon atom of the $C_{12}$ olefin oligomers ranges from about 0.08 to about 0.16; and/or b) comprising at least about 10% $C_{12}$ olefin oligomers, based on total olefin oligomers by mass, and at least about 25% $C_{10}$-$C_{13}$ olefin oligomers, based on total olefin oligomers by mass, and at least the $C_{12}$ olefin oligomers having an average branching index as measured by GC of about 2.0 or less.

In some embodiments, the present disclosure provides compositions comprising at least $C_{16}$ olefin oligomers. The compositions comprise: a plurality of olefin oligomers comprising at least $C_{16}$ olefin oligomers, the olefin oligomers comprising at least about 70 wt. % Type II and Type IV olefins in total and an average number of methyl branches per carbon atom of the $C_{16}$ olefin oligomers ranges from about 0.08 to about 0.16.

In some embodiments, the present disclosure provides zeolite catalysts comprising: ZSM-23 crystallites having a Si:$Al_2$ molar ratio above about 30 and an average crystallite size of about 0.1 microns or less; wherein the ZSM-23 crystallites or ZSM-23 crystallites defining a shaped catalyst body are modified by steaming, modified with an organic acid, modified with a transition metal, modified with coke, modified by NiO impregnation, or any combination thereof.

BRIEF DESCRIPTION OF THE DRAWINGS

The following figures are included to illustrate certain aspects of the disclosure, and should not be viewed as exclusive configurations. The subject matter disclosed is capable of considerable modifications, alterations, combinations, and equivalents in form and function, as will occur to those skilled in the art and having the benefit of this disclosure.

DETAILED DESCRIPTION

Figure 1:
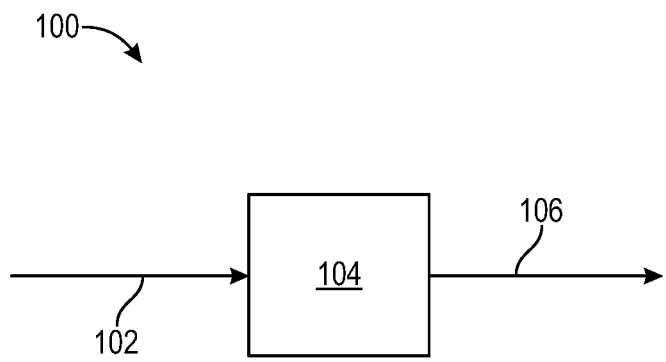
FIGS. 1 and 2 are block diagrams of illustrative olefin oligomerization processes of the present disclosure.

The present disclosure relates to olefin oligomerization and, more particularly, olefin oligomerization conducted with a zeolite catalyst under conditions that may afford improved selectivity for production of olefin oligomers having a specified size and a limited extent of branching therein.

As discussed above, olefin oligomerization may take place in the presence of a solid acid catalyst to afford an oligomerization product comprising a plurality of olefin oligomers. Olefin oligomers exhibiting a range of sizes, extents of branching, and isomeric positioning of the double bond may be obtained under various oligomerization reaction conditions, including the choice of acid catalyst. The nature of the olefin oligomers, or downstream products obtained therefrom, may impact suitability for various applications. As non-limiting examples, the nature of the olefin oligomers may impact properties such as volatility, pour point, biodegradability, solubility, surfactant properties, and reactivity.

In many instances, it can be desirable to limit, to the extent possible, the range of products formed during olefin oligomerization, such as through targeting a specific size range most suitable for an intended application. For example, when preparing olefin oligomers targeted for further conversion into surfactants, it can be desirable to maximize production of olefin oligomers in a $C_{10}$-$C_{13}$ size range, thereby optimizing use of a lower olefin feedstock and decreasing separation burden. When preparing olefin oligomers intended for lubricant applications, a size range targeting larger olefin oligomers may be more desirable, such as $C_{16}$ olefin oligomers. Similarly, it can be desirable to target particular olefin oligomer size ranges for producing gasoline, jet fuel, or diesel hydrocarbons. Olefin oligomers produced outside a targeted size range can be separated by various techniques, such as fractional distillation, if needed, and olefin oligomers having a non-preferred size range may be further fractionated for other applications as needed or recycled for conversion into larger oligomers. While olefin oligomers having a non-preferred size range may be routed to other applications, this may represent an unwanted process inefficiency in some cases.

The extent of branching within a plurality of olefin oligomers may also impact their suitability for an intended application. Depending on various factors, including the oligomerization reaction conditions and the solid acid catalyst employed, the extent of branching may vary significantly in the olefin oligomers produced through olefin oligomerization. Excessive branching may detrimentally lower solubility and biodegradability, for example, whereas relatively few branches may have minimal impact upon these properties. Olefins having a preferred extent of branching, specifically an average branching index of about 2.2 or below, as defined further below, may be produced through various improvements identified in the disclosure herein, surprisingly with improved selectivity for production of olefin oligomers within a targeted size range, particularly in about the $C_{10}$-$C_{13}$ size range for surfactant applications, for example. In the disclosure herein, such olefin oligomers having a preferred extent of branching may be referred to as "lightly branched olefin oligomers." Larger olefin oligomers also having light branching may be made through further tailoring of the process conditions. Surprisingly, considerable tailoring of the composition of $C_{10}$-$C_{13}$ olefin oligomers or even larger olefin oligomers may be realized through variation of the oligomerization reaction conditions, thereby affording further tunability for downstream products formed therefrom. Advantageously, olefin oligomers having a limited extent of branching, as described herein, may be further functionalized without substantially increasing or only minimally increasing the average branching index following functionalization. Paraffinic compounds formed from the olefin oligomers described herein may have advantageous pour points and heat transfer properties as a consequence of their limited extent of branching.

Definitions

All numerical values within the detailed description and the claims herein are modified by "about" or "approximately" with respect to the indicated value, and take into account experimental error and variations that would be expected by a person having ordinary skill in the art. Unless defined otherwise, the terms "about" and "approximately" mean no more than ±5% deviation from the indicated value. Unless otherwise indicated, ambient temperature (room temperature) is about 25° C.

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A," and "B."

For the purposes of the present disclosure, the new numbering scheme for groups of the Periodic Table is used. In said numbering scheme, the groups (columns) are numbered sequentially from left to right from 1 through 18.

The term "hydrocarbon" refers to a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different numbers of carbon atoms. The term "$C_n$" refers to hydrocarbon(s) or a hydrocarbyl group having n carbon atom(s) per molecule or group, wherein n is a positive integer. Such hydrocarbon compounds may be one or more of linear, branched, cyclic, acyclic, saturated, unsaturated, aliphatic, or aromatic. Optional heteroatom substitution may be present in a hydrocarbon or hydrocarbyl group.

The terms "hydrocarbyl" and "hydrocarbyl group" are used interchangeably herein. The term "hydrocarbyl group" refers to any $C_1$-$C_{10}$ hydrocarbon group bearing at least one unfilled valence position when removed from a parent compound. Suitable hydrocarbyl groups may be cyclic or acyclic, branched or unbranched, and/or aliphatic or aromatic.

The term "alkyl" refers to a hydrocarbyl group having no unsaturated carbon-carbon bonds. Optional heteroatom substitution or branching may be present in an alkyl group, unless otherwise specified herein.

The term "alkenyl" refers to a hydrocarbyl group having a carbon-carbon double bond. The terms "alkene" and "olefin" are used synonymously herein. Similarly, the terms "alkenic" and "olefinic" are used synonymously herein. Unless otherwise noted, all possible geometric isomers are encompassed by these terms.

The terms "linear" and "linear hydrocarbon" refer to a hydrocarbon or hydrocarbyl group having a continuous carbon chain without substantial side chain branches.

The term "linear alpha olefin (LAO)" refers to an alkenic hydrocarbon bearing a carbon-carbon double bond at a terminal (end) carbon atom of the main carbon chain. Most often, no side chain branches are present in a LAO, although there may occasionally be a minor amount of branching component in a given LAO sample.

The terms "branch," "branched" and "branched hydrocarbon" refer to a hydrocarbon or hydrocarbyl group having a linear main carbon chain in which a hydrocarbyl side chain extends from the linear main carbon chain. The term "unbranched" refers to a straight-chain hydrocarbon or hydrocarbyl group without side chain groups extending therefrom.

The term "weight hour space velocity" (WHSV) refers to a measure of the weight of a feed mixture flowing per unit weight of a catalyst per hour.

The term "transition metal" refers to any element from Groups 3-12 of the Periodic Table. As used herein, the term "transition metal" is also inclusive of lanthanide and actinide elements.

The term "methyl branch" refers to any non-terminal methyl group in an acyclic hydrocarbon. Methyl branches may include a non-terminal methyl group bonded to the main carbon chain in an acyclic hydrocarbon or a methyl group-containing hydrocarbyl branch bonded to the main carbon chain in an acyclic hydrocarbon. The main carbon chain of an acyclic hydrocarbon contains two terminal methyl groups or an equivalent thereof at each end of the main carbon chain, which are not counted among methyl branches.

Lightly Branched Olefins

In the present disclosure, the term "lightly branched olefin" refers to an olefin oligomer or mixture of olefin oligomers collectively having an average number of branches, specified as the average branching index (BI), of about 2.2 or less, such as an average branching index of about 1.3 to about 2.0, or about 1.4 to about 1.9, or about 1.3 to about 1.7, or about 1.4 to about 1.7. It is to be understood that some olefin oligomers in a mixture of olefin oligomers characterized as "lightly branched" may be unbranched and some olefins may have two or more branches, including two branches, three branches, four branches, five branches, and so on. When unbranched or more extensively branched olefin oligomers are present in a mixture of olefin oligomers, the other olefin oligomers are present in such amounts to place the weighted average of the number of branches within the foregoing ranges. Unless otherwise specified herein, all average branching index values specified herein are measured by gas chromatography (GC).

Unless otherwise specified, the average branching index within a particular mixture of olefin oligomers equals (0×% linear olefins+1×% monobranched olefins+2×% dibranched olefins+3×% tribranched olefins)/100; wherein % linear olefins+% monobranched olefins+% dibranched olefins+% tribranched olefins=100%. The foregoing are weight percentages (wt. %). For example, a mixture of $C_8$ olefin oligomers comprising 10% linear $C_8$ olefins, 30% monobranched $C_8$ olefins, 50% dibranched $C_8$ olefins, and 10% tribranched $C_8$ olefins has an average branching index of 1.6. More highly branched individual olefin oligomers (e.g., tetrabranched and higher) may be weighted similarly to determine the average branching index.

Lightly branched olefin oligomers having vinyl termination may have a structure represented generically by Formula 1 below.

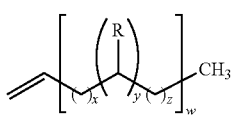

Formula 1

In Formula 1, x is an integer ranging from 0 to about 10, R is a hydrogen or hydrocarbyl group, preferably an alkyl group, more preferably a methyl group, y is an integer ranging from 1 to 3, z is an integer ranging from 0 to about 10, and w is an integer ranging from 1 to about 10, with the proviso that in a given product mixture characterized as being "lightly branched," the variables are selected such that the average branching index for specified olefin oligomers within the product mixture (including both vinyl terminated olefin oligomers represented by Formula 1 and internal olefin oligomers represented by Formula 2 below) is collectively about 2.2 or below, preferably about 2.0 or below, such as about 1.3 to about 2.0 or about 1.3 to about 1.7. Preferably, variables w, x, y and z may be chosen such that the total number of carbon atoms in a given olefin oligomer or mixture of olefin oligomers ranges from about 8 to about 13, or about 8 to about 16, or about 8 to about 24, or about 10 to about 13, or about 14 to about 16, or about 17 to about 20, or about 20 to about 24, or about 15 to about 18. Olefin oligomers having 10 to about 13 carbon atoms may be particularly desirable when functionalized to form amphiphilic compounds for surfactant applications. Such olefin oligomers having vinyl termination may be produced in combination with other types of olefin oligomers (i.e., Types II-IV), as described hereinafter. As indicated above, any combination of unbranched, monobranched, dibranched, tribranched and more heavily branched olefin oligomers may be present if the mixture of olefin oligomers collectively exhibits an average branching index in the foregoing range. The branches present within any of the foregoing branched olefins may be methyl branches or methyl-containing branches in particular instances. Branches may be present at any position of the olefin.

Internal olefin oligomers having light branching may have a structure represented generically by Formula 2 below

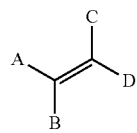

Formula 2 wherein A, B, C and D are independently hydrogen or a linear or branched alkyl group, wherein multiple alkyl groups may be the same or different, and further provided that B, C and D are not all H, or C and D are not both H. When A, B, C and/or D are alkyl groups, the alkyl groups may contain at most one or two branches. Accordingly, internal olefin oligomers having light branching may have structures represented by any of Formulas 2A-2D, wherein each Alk is an independently selected alkyl group, particularly an optionally branched alkyl group having 1 to about 16 carbon atoms, or 1 to about 14 carbon atoms, or 1 to about 12 carbon atoms, or 1 to about 10 carbon atoms.

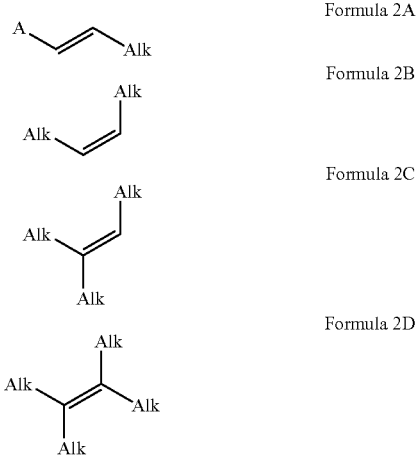

Formula 2A

Formula 2B

Formula 2C

Formula 2D

Each Alk may have a structure independently represented by Formula 3,

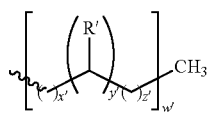

Formula 3 wherein the wavy bond represents bonding to the double bond in Formulas 2A-2D, x' is an integer ranging from 0 to about 10, R' is a hydrogen or hydrocarbyl group, preferably an alkyl group, more preferably a methyl group, y' is an integer ranging from 1 to 3, z' is an integer ranging from 0 to about 10, and w' is an integer ranging from 1 to about 10, with the proviso that in a given product mixture characterized as being "lightly branched," the variables are selected such that the average branching index for specified olefin oligomers within the product mixture (including both vinyl terminated olefin oligomers represented by Formula 1 and internal olefin oligomers represented by Formula 2) is collectively about 2.2 or below, preferably about 2.0 or below, such as about 1.3 to about 2.0 or about 1.3 to about 1.7. Preferably, variables w', x', y' and z' may be chosen such that the total number of carbon atoms in a given olefin oligomer or mixture of olefin oligomers ranges from about 8 to about 13, or about 8 to about 16, or about 8 to about 24, or about 10 to about 13, or about 14 to about 16, or about 17 to about 20, or about 20 to about 24, to about 15 to about 18.

Particular examples of olefin oligomers accessible through the disclosure herein may include olefin oligomers comprising one or more oligomers having about 8 to about 24 carbon atoms in total, or about 8 to about 16 carbon atoms in total, or about 10 to about 20 carbon atoms in total, or any subrange thereof, and comprising at least about 70 wt. % internal olefins in total, preferably at least about 70 wt. % Type II and Type IV olefins in total, wherein an average number of methyl branches per carbon atom of at least $C_{12}$ and/or $C_{16}$ olefin oligomers ranges from about 0.08 to about 0.16, preferably about 0.08 to about 0.14. In particular examples, at least a majority of the olefin oligomers are $C_{10}$-$C_{13}$ olefin oligomers with respect to an amount (mass) of other olefin oligomers produced, and at least $C_{12}$ olefin oligomers of the $C_{10}$-$C_{13}$ olefin oligomers have an average branching index of about 2.2 or less, such as an average branching index ranging from about 1.3 to about 2.0, or about 1.3 to about 1.7. Other olefin oligomers may have a similar branching index to the $C_{12}$ olefin oligomers, such as $C_{16}$ olefin oligomers. In more particular examples, the $C_{12}$ olefin oligomers may comprise no more than 10 wt. % linear olefin oligomers and/or no more than 5 wt % tribranched and more highly branched olefin oligomers. Still more particular examples may include those in which the plurality of olefin oligomers comprise at least about 10% $C_{12}$ olefin oligomers, based on total olefin oligomers by mass, and at least about 25% $C_{10}$-$C_{13}$ olefin oligomers, based on total olefin oligomers by mass, in which at least the $C_{12}$ olefin oligomers have an average branching index of about 2.2 or less, such as an average branching index ranging from about 1.3 to about 2.0, or about 1.3 to about 1.7. $C_{14}$-$C_{17}$ olefin oligomers having an average branching index within the above ranges and with similar amounts of linear and branched olefins may also be favorable in some cases and attainable through the disclosure herein.

As described further below, olefin oligomers having an average branching index of about 2.2 or less (e.g., about 1 to about 2, or about 1.3 to about 1.7) may exhibit advantageous biodegradation properties. For example, $C_{12}$ olefin oligomers having an average branching index of about 1 to about 2 may exhibit about 30-50% biodegradation within a 10-day window once an initial level of 10% biodegradation has been reached. Further functionalization of the olefin moiety may further increase the biodegradability.

Oligomerization to Produce Lightly Branched Olefins

Lightly branched olefins may be produced via oligomerization of a feed mixture comprising one or more olefins having a chain length of about 10 carbons or fewer, particularly one or more $C_2$ to $C_{10}$ linear olefins or a mixture of one or more $C_2$-$C_{10}$ linear olefins and a branched $C_2$-$C_{10}$ olefin, such as isobutylene. Still more particular examples may include a feed mixture comprising at least one $C_3$ olefin and/or at least one $C_4$ olefin. The at least one $C_4$ olefin may comprise a $C_4$ linear olefin, a $C_4$ branched olefin, or any combination thereof. The one or more linear olefins may comprise one or more linear alpha olefins, one or more linear internal olefins, or a mixture of one or more linear alpha olefins and one or more linear internal olefins, any of which may be in further combination with a branched $C_2$-$C_{10}$ olefin, such as isobutylene. Example oligomerization reaction conditions may include contacting a suitable feed mixture comprising the one or more olefins under the oligomerization reaction conditions in the presence of a solid acid catalyst and forming a product mixture comprising a plurality of olefin oligomers, in which the average branching index of at least $C_{12}$ olefin oligomers in the product mixture is about 2.2 or below, such as an average branching index of about 1.3 to about 2.0, or about 1.3 to about 1.7. Other olefin oligomers produced under the oligomerization reaction conditions may have a similar average branching index. The individual olefin oligomers may comprise monomer units of the same olefin or different olefins from the feed mixture. A limited extent of cracking may also take place during olefin oligomerization, such that olefin oligomers not having an even multiple of carbon atoms with respect to the olefin monomers within the feed mixture may be produced. Cracking may also result in a range of carbon chain lengths being produced in the olefin oligomers formed under the oligomerization reaction conditions. Feed mixtures comprising more than one olefin may similarly lead to a range of carbon chain lengths being produced. Even though a range of carbon chain lengths may be produced, certain carbon chain lengths or one carbon chain length may predominate for a specified feed under given oligomerization reaction conditions.

Solid acid catalysts suitable for producing olefin oligomers having an average branching index of about 2.2 or less, particularly for $C_{12}$ olefin oligomers having an average branching index of about 2.2 or less, such as an average branching index of about 1.3 to about 2.0, may include, for example, zeolite catalysts having an MTT or TON framework, including unmodified zeolite catalysts having these frameworks. Suitable examples may include, for instance, ZSM-22, ZSM-23, ZSM-57, and SAPO-11. Such solid acid catalysts and other zeolite catalysts may be modified by steaming, modified with an organic acid, modified with a transition metal, modified with coke, impregnated with NiO, or any combination thereof. Suitable modification conditions are described further below. Although already suitable for producing an average branching index of about 2.2 or less, such modifications to these zeolite catalysts may further improve selectivity and/or decrease the average branching index, as explained further below.

Such solid acid catalysts may afford selectivity for forming $C_{10}$-$C_{13}$ olefin oligomers when exposed to suitable oligomerization reaction conditions, wherein selectivity may be characterized, in at least one embodiment, by production of at least about 10% $C_{12}$ olefin oligomers and at least about 25% $C_{10}$-$C_{13}$ olefin oligomers, based upon total olefin oligomers produced in the oligomerization reaction. $C_{12}$ olefin oligomers having an average branching index of about 2.2 or less, preferably about 1.3 to about 2.0, may be produced under these oligomerization reaction conditions. Higher olefin oligomers (e.g., $C_{14}$-$C_{16}$ olefin oligomers) may be produced by recycling $C_{10}$-$C_{13}$ olefin oligomers to the oligomerization reaction conditions. Alternately, higher olefin oligomers having a specified selectivity and average branching index may be produced directly from the oligomerization reaction conditions.

Other examples of solid acid catalysts suitable for producing olefin oligomers, particularly with selectivity toward formation of $C_{10}$-$C_{13}$ olefin oligomers, may include, for example, zeolite catalysts having an MTT, MWW, MRE, MFI, MTW or TON framework, wherein the zeolite catalyst is further modified by steaming, modified with an organic acid, modified with a transition metal, modified with coke, modified by impregnation with NiO, or any combination thereof. Such zeolite catalysts may afford a selectivity value exceeding 25% when producing $C_1$-$C_{13}$ olefin oligomers under suitable oligomerization reaction conditions. Still other examples may include a sequenced arrangement of a MTT framework zeolite as a first component and a second component selected from an MFS framework zeolite and a supported NiO catalyst. The sequenced arrangement may be a stacked bed arrangement of the first component and the second component in particular process configurations. Alternately, a suitable sequenced arrangement may comprise the first component and the second component in sequential reactors arranged in series. In still another alternative, a zeolite catalyst having an MTT framework may be present in a first reactor and a zeolite catalyst having a MFS framework may be present in a second reactor parallel to the first reactor, wherein intermediate product mixtures obtained from the first and second reactors may be blended to afford a product mixture having a branching index of about 1.3 to about 2.0, as measured by GC.

Suitable zeolite catalysts, such as ZSM-23, can be prepared from extrudates about 1 wt. % to about 90 wt. % binder and about 10 wt. % to about 99 wt. % zeolite) or from zeolite crystal seeds. Examples of suitable binders may include silica, alumina, zirconia, titania, silica-alumina, metal oxides, the like, and mixtures thereof. Particular zeolite catalysts may be crystalline and have an aspect ratio of about 1 to about 5, alternatively about 2 to about 4, with a width of less than about 0.1 microns and a length of less than about 0.3 microns. Prior to use, the zeolite catalysts may be calcined in air at about 425° C. to about 650° C. for about 1 hour to overnight.

Particular zeolite catalyst examples may include, for example, a Si/Al ZSM-23 catalyst having no amine treatment and a Si:$Al_2$ molar ratio of about 20 to about 60, or about 25 to about 55, or about 30 to about 50, or about 30 to 45. Si/Al ZSM-23 catalysts may be prepared as described in U.S. Pat. Nos. 4,076,842 and 5,332,566, each of which is incorporated herein by reference. Alternatively, the zeolite catalyst may be a Si/Al/Ti ZSM-23 catalyst having no amine treatment and a Si:$Al_2$ molar ratio of about 20 to about 60, or about 25 to about 55, or about 30 to about 50 and a Ti:Al molar ratio of about 0.1 to about 3, or about 0.2 to about 2, or about 0.3 to about 1. Si/Al/Ti ZSM-23 catalysts may be prepared as described in the foregoing US Patents. A combination of the two ZSM-23 catalyst types may be used. In still other examples, the zeolite catalyst may have a Si:$Al_2$ molar ratio of about 30:1 to about 200:1 and comprise about 0.1 wt. % to about 5 wt. % transition metal and about 0.1 wt. % to about 3.3 wt. % framework Al—O.

In another example, ZSM-23 may be prepared from a reaction mixture comprising water, a structure directing agent, silica, sodium aluminate, and sodium hydroxide solution. Such zeolite catalysts may be characterized by ZSM-23 crystallites having a Si:$Al_2$ molar ratio of about 30 or above, such as about 35 to about 60, or about 30 to about 200 and have a crystallite size of about 0.5 microns or less, more typically about 0.1 microns or less. Preferably, at least about 80% of the crystallites may range from about 300 Å to about 800 Å in size. One desirable crystallite morphology obtainable under these conditions may have a rice-shaped structure having a length to diameter ratio of about 3 or less. The ZSM-23 may be bound with a silica or alumina binder and be present in the form of spheres, extrudates, or other types of shaped catalyst bodies. Such characterized ZSM-23 may be further modified under any of the conditions specified below to further modify the catalytic properties.

As indicated above, various zeolite catalysts may be modified in the disclosure herein. Suitable modifications include, but are not limited to, modified by steaming, modified with an organic acid (e.g., by acid washing), modified with a transition metal, modified with coke, modified by impregnation with NiO, or any combination thereof. In particularly advantageous examples, the zeolite catalyst may be doubly modified by steaming and an additional modification selected from the group consisting of modified with an organic acid, modified with a transition metal, and any combination thereof. Steaming may be performed first or second when forming doubly modified zeolite catalysts.

Steaming may be performed by exposing the zeolite catalyst to steam at a temperature ranging from about 200° C. to about 550° C., or about 225° C. to about 400° C., or about 250° C. to about 375° C., for about 1 hour to about 24 hours, or about 2 hours to about 12 hours, or about 5 hours to about 6 hours, or about 1 hour to about 4 hours.

Modification by an organic acid may be performed by acid washing the zeolite catalyst in an aqueous acid solution at a temperature of about 20° C. to about 100° C., or about 25° C. to about 50° C., or about 60° C. to about 80° C. for about 1 hour to about 24 hours, or about 5 hours to about 6 hours, or about 1 hour to about 4 hours. Following acid washing, the modified zeolite may be removed by decantation and dried. Suitable organic acids include, but are not limited to, oxalic acid, malonic acid, succinic acid, glutaric acid, adipic acid, maleic acid, phthalic acid, isophthalic acid, terephthalic acid, fumaric acid, tartaric acid, the like, and mixtures thereof. The organic acid may be present at any suitable concentration within the aqueous acid solution, such as, for example, about 1 M to about 4 M, or about 1 M to about 2 M, or about 2 M to about 4 M.

Modification with a transition metal may be conducted by incipient wetness impregnation of the zeolite catalyst with a transition metal salt (including a rare earth metal salt) and calcining to leave a transition metal oxide incorporated within the porosity of the zeolite. Impregnation of the zeolite catalyst with a transition metal may be performed as described in U.S. Pat. No. 7,759,533, which is incorporated herein by reference. Examples of transition metals that may be incorporated within the zeolite catalyst include, but are not limited to, yttrium, tungsten, vanadium, molybdenum, rhenium, nickel, cobalt, chromium, manganese, lanthanum, other lanthanides, noble metals such as platinum or palladium, or any combination thereof. NiO impregnation, in particular, may be performed in this manner. Following calcination, the transition metal may comprise about 0.5 wt. % to 2.5 wt. % of the zeolite, or about 0.75 wt. % to 2 wt. %, or about 1.5 wt. % to about 2.5 wt. %.

Depositing coke on the zeolite catalysts to promote modification thereof may be achieved by exposing the zeolite catalyst to a carbon feedstock under coking conditions. Suitable coking conditions may include, for example, exposure of the zeolite catalyst to hydrocarbons at a temperature ranging from about 200° C. to about 400° C. at a pressure of about 50 bar to about 100 bar. The coke may be deposited upon the surface of the zeolite catalyst. Any of the olefins or olefin feed mixtures comprising olefin feedstocks may comprise the carbon feedstock employed for coking, although any other saturated, unsaturated and/or aromatic hydrocarbon may also be suitably used to promote coking.

NiO impregnated catalysts may be produced through incipient wetness by contacting an aqueous nickel solution (e.g., nickel nitrate) with the zeolite catalyst, followed by drying and calcination. Following nickel impregnation, the nickel content may range from about 0.5 wt. % to about 3 wt. %, as measured by inductively coupled plasma mass spectrometry.

Particularly advantageous zeolite catalysts may be doubly modified by two or more modifications performed in sequence. In especially suitable examples, the zeolite catalyst may be steamed and modified with an organic acid, preferably oxalic acid. Steaming and acid washing may be carried out under the conditions specified above. Steaming or acid washing may be conducted first. In another especially suitable example, the zeolite catalyst may be steamed and modified with a transition metal, preferably yttrium. Steaming or transition metal impregnation may be conducted first The zeolite catalysts, including ZSM-23, described herein may be characterized in terms of their micro surface area, external surface area, and total surface area. Total surface area represents the sum of micro surface area and external surface area. Micro surface areas may range from about 50 to about 400 m$^2$/g, or about 100 to about 350 m$^2$/g, or about 120 to about 240 m$^2$/g, and external surface areas may range from about 40 to about 180 m$^2$/g, or about 50 to about 150 m$^2$/g, or about 60 to about 130 m$^2$/g, measured as follows. The total BET surface area and the t-plot micropore (micro) surface area may be measured by nitrogen adsorption/desorption with a Micromeritics Tristar II 3020 instrument after degassing of calcined zeolite catalyst powder for 4 hours at 350° C. Mesopore surface area may be obtained by subtraction of the t-plot micropore surface area from the total BET surface area. Mesopore volume may be derived from the same data set. Further information regarding the analytical methods may be found in, for example, "Characterization of Porous Solids and Powders: Surface Area, Pore Size and Density", S. Lowell et al., Springer, 2004.

Alpha value is a measure of the cracking activity of a catalyst and is described in, for example, U.S. Pat. No. 3,354,078 and Journal of Catalysis, Vol. 4, p. 527 (1965); Vol. 6, p. 278 (1966) and Vol. 61, p. 395 (1980), each of which is incorporated herein by reference. Zeolite catalysts disclosed herein may have alpha values ranging from about 100 to about 700, or about 200 to about 500, or about 250 to about 450. Preferably, the alpha value for ZSM-23 is greater than 200. The experimental conditions of the measurements herein include a constant temperature of 538° C. and a variable flow rate as described in detail in the Journal of Catalysis, Vol. 61, p. 395 (1980).

Hexane absorption values of the zeolite catalysts disclosed herein, including ZSM-23, may be about 30 or above (mg hexane/gram zeolite catalyst) or about 50 or above, as measured by differential scanning calorimetry.

The zeolite catalysts herein also may be characterized by X-ray diffraction. The X-ray diffraction data (powder XRD or XRD) were collected with a Bruker D4 Endeavor diffraction system with a VÅNTEC multichannel detector using copper K-alpha radiation. The diffraction data were recorded by scanning mode with 0.018 degrees two-theta, where theta is the Bragg angle, and using an effective counting time of about 30 seconds for each step.

The crystal sizes in the a, b and c crystal vectors were calculated from the XRD data based on the three (200), (020) and (002) peaks in the X-ray diffraction patterns using the Scherrer equation (P. Scherrer, N. G. W. Gottingen, Math-Pys., 2, p. 96-100 (1918)). The method and its application to zeolites are also described in A. W. Burton, K. Ong, T. Rea, I. Y. Chan, Microporous and Mesoporous Materials, 117, p. 75-90 (2009). For the measurements described herein, the Jade version 9.5.1 X-ray diffraction analysis software by Materials Data, Inc. was used to perform the calculation.

Oligomerization may be carried out in a fixed bed reactor, a packed bed reactor, a tubular reaction, a fluidized bed reactor, a slurry reactor, a continuous catalyst regeneration reactor, or any combination thereof. Suitable oligomerization reaction conditions may include a reaction temperature of about 80° C. to about 350° C., or about 90° C. to about 350° C., or about 150° C. to about 350° C., or about 200° C. to about 300° C., or about 220° C. to about 260° C., or about 90° C. to about 210° C., or about 160° C. to about 240° C., or about 170° C. to about 210° C. Oligomerization may take place at a pressure ranging from about 50 bar to about 300 bar, or about 60 bar to about 150 bar, or about 70 bar to about 120 bar.

Oligomerization may be carried out at a WHSV ranging from about 2 hr$^{-1}$ to 70 hr$^{-1}$, or about 5 hr$^{-1}$ to about 30 hr$^{-1}$, or about 5 hr$^{-1}$ to about 10 hr$^{-1}$, or about 10 hr$^{-1}$ to about 15 hr$^{-1}$, or about 15 hr$^{-1}$ to about 20 hr$^{-1}$, or about 20 hr$^{-1}$ to 30 hr$^{-1}$. Surprisingly, certain zeolite catalysts, particularly those having an MTT framework, such as ZSM-23 or modified ZSM-23, may promote formation of $C_{10}$-$C_{13}$ olefin oligomers with relatively good selectivity, while affording a branching index for at least $C_{12}$ olefins of about 2.2 or less, particularly about 1.3 to about 2.0. In particular examples, at least one of the WHSV and temperature may be adjusted to produce a targeted extent of olefin conversion to afford a targeted average branching index for $C_{12}$ olefin oligomers and/or a targeted selectivity for $C_{10}$-$C_{13}$ olefin oligomers.

The conversion of a feed mixture to a plurality of olefin oligomers under the oligomerization reaction conditions may be about 20% or greater, or about 40% or greater, or about 60% or greater, or about 80% or greater. Particular examples may include a feed mixture conversion of about 50% to about 75% at a WHSV ranging from about 6 hr$^{-1}$ to about 30 hr$^{-1}$. More desirable examples for modified MTT zeolite catalysts, such as ZSM-23, may include a feed mixture conversion of about 55% to about 75% or about 59% to about 72% at a WHSV ranging from about 20 hr$^{-1}$ to about 30 hr$^{-1}$ or about 23 hr$^{-1}$ to about 29 hr$^{-1}$. Another particular example may include oligomerization reaction conditions taking place at a WHSV ranging from about 12 hr$^{-1}$ to about 62 hr$^{-1}$, and at least one of the WHSV and temperature is selected to provide an average branching index for at least $C_{12}$ olefin oligomers ranging from about 1.4 to about 1.9 and a selectivity for $C_{10}$-$C_{13}$ olefin oligomers ranging from about 30% to about 55% or about 32% to about 54%.

FIG. 1 is a block diagram of a first oligomerization process 100 of the present disclosure. In oligomerization process 100, feed mixture 102 comprising at least one olefin, preferably at least one $C_3$ and/or at least one $C_4$ olefin, is fed into one or more reactor(s) 104 containing a zeolite catalyst capable of promoting oligomerization. Reactor(s) 104 is/are maintained under oligomerization reaction conditions to facilitate catalyzed oligomerization of feed mixture 102 into olefin oligomers 106, wherein olefin oligomers 106 have an average branching index of about 2.2 or less, particularly comprising at least $C_{12}$ olefin oligomers having an average branching index of about 2.2 or less. Feed mixture 102 may comprise primarily $C_n$ and $C_{2n}$ olefins and/or paraffins, and oligomers 106 may comprise $C_{3n}$ oligomers (i.e., olefin trimers) or higher oligomers, wherein n is the number of carbon atoms in the olefin undergoing oligomerization.

Figure 2:
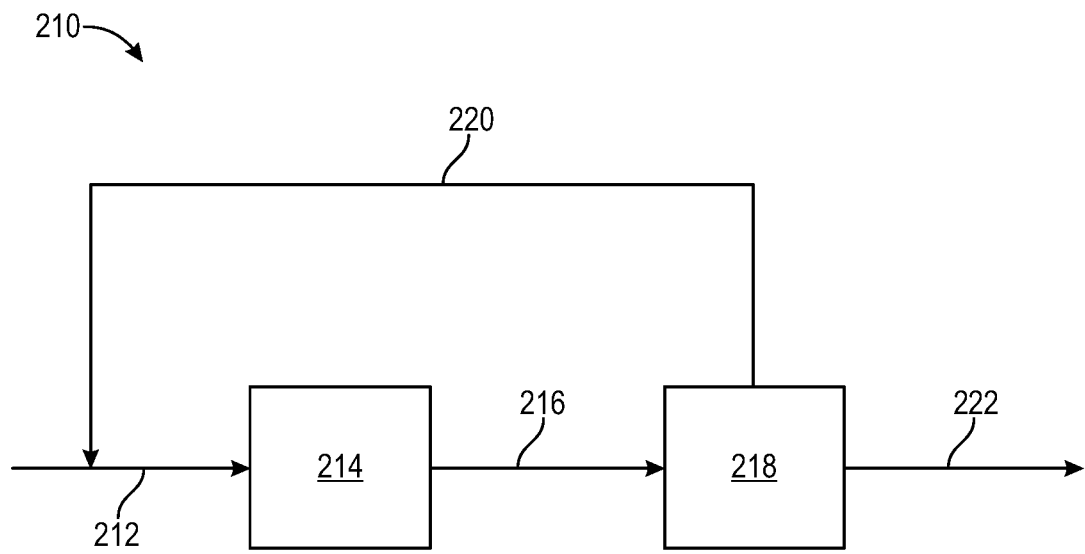

FIG. 2 is a block diagram of a second oligomerization process 210 of the present disclosure. Feed mixture 212 is fed into reactor(s) 214 containing a zeolite catalyst capable of promoting oligomerization. Reactor(s) 214 is/are maintained under oligomerization reaction conditions to facilitate catalyzed oligomerization of feed mixture 212 to produce product mixture 216, wherein olefin oligomers within product mixture 216 have an average branching index of about 2.2 or less, particularly comprising at least $C_{12}$ olefin oligomers having an average branching index of about 2.2 or less. Product mixture 216 is then separated (e.g., in a distiller or recovery tower 218) to produce recycle stream 220 and olefin oligomers 222. Recycle stream 220 is then fed back to reactor(s) 214. Optionally, recycle stream 220 may pass through a de-butanizer prior to being returned to reactor(s) 214. As illustrated, recycle stream 220 is entrained with feed mixture 212 prior to reintroduction to reactor(s) 214. In one example, feed mixture 212 comprises primarily $C_n$ and $C_{2n}$ olefins and/or paraffins, product mixture 216 comprises a mixture of $C_n$ and $C_{2n}$ olefins and/or paraffins and $C_{3n}$ olefin oligomers, recycle stream 220 comprises $C_n$ and $C_{2n}$ olefins and/or paraffins, and olefin oligomers 222 comprises $C_{3n}$ olefin oligomers. Higher olefin oligomers such as $C_{4n}$, $C_{5n}$ and $C_{6n}$ may also be present in product mixture 216. Recycle stream 220 may be employed if production of higher olefin oligomers does not occur adequately upon initial exposure of feed mixture 212 to the oligomerization reaction conditions.

Feed Mixture

In the disclosure herein, a feed mixture comprising at least one $C_3$ olefin and/or at least one $C_4$ olefin, optionally with olefin oligomer recycling, may undergo oligomerization in the presence of a zeolite catalyst under oligomerization reaction conditions effective to form a product mixture comprising a plurality of olefin oligomers. Advantaged zeolite catalysts effective for promoting high conversion rates of the feed mixture and forming $C_{10}$-$C_{13}$ olefin oligomers with good selectivity may be realized through the disclosure herein, particularly for producing $C_{10}$-$C_{13}$ olefin oligomers in which at least $C_{12}$ olefin oligomers may feature an average branching index of about 2.2 or less, more preferably about 1.3 to about 2.0. Surprisingly, the selectivity toward formation of $C_{10}$-$C_{13}$ olefin oligomers may be modulated by varying the parameters of the oligomerization reaction and/or by varying the composition of the feed mixture without significantly impacting the average branching index of at least the $C_{12}$ olefin oligomers. Modulation of one or more of the feed mixture and/or the oligomerization reaction conditions may be employed to produce a targeted conversion to $C_{10}$-$C_{13}$ olefin oligomers, including a targeted amount of $C_{12}$ olefin oligomers within the $C_{10}$-$C_{13}$ olefin oligomers, and/or a targeted conversion of the olefins within the feed mixture. The average branching index of at least $C_{12}$ olefin oligomers and the selectivity for $C_{10}$-$C_{13}$ olefin oligomers may be correlated to one another in some cases, thereby allowing at least one of the WHSV and temperature to be selected to afford a targeted average branching index and/or a targeted selectivity for $C_{10}$-$C_{13}$ olefin oligomers by virtue of the extent of conversion of the feed mixture.

Feed mixtures used in the advantaged oligomerization processes disclosed herein may comprise at least one $C_3$ olefin and/or at least one $C_4$ olefin to afford production of a plurality of olefin oligomers in the $C_{10}$-$C_{13}$ size range. The term "feed" refers to an olefin resource and optional diluent obtained from a supply thereof (fresh feed) and/or a recycle feed provided from a reactor performing the processes described herein. Other olefin oligomers in various sizes may be produced in other amounts, including through product recycling and/or varying the oligomerization reaction conditions. The feed mixture may comprise propylene and one or more linear butenes (e.g., 1-butene, cis-2-butene, trans-2-butene, or any combination thereof), optionally in further combination with isobutylene. Feed mixtures containing isobutylene may comprise Raffinate-1, optionally in further combination with other linear olefins, such as blends of Raffinate-1 and Raffinate-2. In particular embodiments, the feed mixture may comprise propylene and 1-butene (or a mixture of 1-butene, cis-2-butene, and trans-2-butene, such as Raffinate-2), or 1-butene (or a mixture of 1-butene, cis-2-butene, and trans-2-butene, such as Raffinate-2) and isobutylene. The ratio of propylene:1-butene (or other linear butenes) or 1-butene (or other linear butenes):isobutylene may be altered to tailor the selectivity for production of $C_{10}$-$C_{13}$ olefin oligomers in a non-limiting example. A saturated hydrocarbon diluent may also be present in an amount up to about 50 wt. % or up to about 80 wt. % of the feed mixture.

In any embodiment herein, the feed mixture may have an olefinicity of about 80 wt. % or less, or about 70 wt. % or less, or about 50 wt. % or less, wherein olefinicity refers to the percentage of olefin molecules relative to all molecules in the feed mixture on a mass basis. Commercially available raffinate feed mixtures suitable for use herein, for example, may have an olefinicity ranging from about 50 wt. % to about 70 wt. % and also contain significant quantities of cis- and trans-2-butene. Other suitable feed mixtures may have an olefinicity ranging from about 40% to about 50%, or about 30% to about 40%, or about 5% to about 25%, or about 25% to about 45%. Non-olefin components of the feed mixture may comprise a saturated hydrocarbon diluent, such as methane, ethane, propane, butane, isobutane, or any combination thereof. Particular olefin feed mixtures may comprise or consist essentially of at least one linear butene (e.g., 1-butene, cis-2-butene, trans-2-butene, or any combination thereof) and a saturated hydrocarbon diluent, preferably butane, or at least one linear butene (e.g., 1-butene, cis-2-butene, trans-2-butene, or any combination thereof), isobutylene, and a saturated hydrocarbon diluent, preferably butane.

Methods of the present disclosure may comprise separating a recycle stream from the product mixture obtained following oligomerization, and reintroducing the recycle stream to the zeolite catalyst. The recycle stream may comprise at least one olefin oligomer smaller in size than a targeted olefin oligomer size. The recycle stream may be returned to the feed mixture before being reintroduced to the zeolite catalyst, or the recycle stream may be returned to the zeolite catalyst directly without being combined with the feed mixture. Optionally, a debutanizer may be employed to remove butane and unreacted butene(s) from the recycle stream prior to reintroduction to the zeolite catalyst. The recycle stream may comprise a plurality of olefin oligomers smaller than the olefin oligomers in a targeted size range, such as $C_{10}$-$C_{13}$ olefin oligomers. For example, when forming $C_{10}$-$C_{13}$ olefin oligomers, a recycle stream comprising $C_8$ olefin oligomers (e.g., a dimer formed from $C_4$ olefins, such as an octene dimer) may be separated and returned to the feed mixture or zeolite catalyst. As such, the feed mixture may further comprise one or more $C_6$-$C_9$ olefin oligomers, such as $C_6$ olefin oligomers and/or $C_8$ olefin oligomers, which may be in further combination with a saturated hydrocarbon diluent, when producing $C_{10}$-$C_{12}$ olefin oligomers according to the disclosure herein. Larger olefin oligomers, in turn, such as $C_{15}$-$C_{18}$ olefin oligomers may be obtained by recycling $C_8$ and/or $C_{12}$ olefin oligomers and conducting further oligomerization.

The feed mixture employed in the disclosure herein may be substantially free of aromatic hydrocarbons, including about 5 wt. % or less aromatic hydrocarbons, about 1 wt. % or less aromatic hydrocarbons, or about 0.5 wt. % or less aromatic hydrocarbons.

The feed mixture may also comprise contaminants or compounds that hinder catalyst lifetime or productivity. Such contaminants or compounds are preferably minimized or removed and may include nitrogen-, sulfur-, chlorine-, or oxygen-containing compounds, and mixtures thereof. Examples of nitrogen containing compounds that may shorten the lifetime or productivity of the zeolite catalyst include, for example, nitriles (e.g., acetonitrile, propionitrile, and the like), ammonia, amides, amines, pyridines, imides, cyanates, pyrroles, pyrrolidones, and mixtures thereof. Other compounds that may hinder catalyst lifetime or productivity and are preferably minimized or removed include, for example, linear and cyclic dienes such as butadiene, pentadiene, cyclopentadiene, and mixtures thereof.

More particular examples of suitable feed mixtures include untreated refinery streams such as Fluidized Catalytic Cracking (FCC) streams, coker gas streams, pygas streams, and reformate streams containing a tolerable amount of aromatic compounds. Other examples of suitable feed mixtures may include, for example, Raffinate-1 (RAF-1), Raffinate-2(RAF-2), and/or Raffinate-3. Typically, Raffinate-1, Raffinate-2, and Raffinate-3 may be regarded as stages in the processing of crude, generally, $C_4$ streams. Examples of Raffinate products that may be suitable as feed mixtures can be found in U.S. Pat. No. 7,759,533, which is incorporated herein by reference. These streams may be obtained from olefin steam crackers but may also come from refinery cat-crackers, butane dehydrogenation units, gas-to-olefin (GTO) units, or Fisher-Tropsch units, in which case they may contain the same components but in different proportions, preferably after removal of butadiene. Raffinate-1 generally consists of isobutylene, 1-butene and 2-butene, and smaller quantities of butanes and other compounds. Raffinate-2 may be produced by removal of the isobutylene. Raffinate 3 may be obtained after separation of 1-butene from Raffinate-2 with a residual 1-butene content of about 1%. Any of the foregoing feed sources from a refinery may be obtained from recycled plastic or a biofeed or other suitable bio-source.

Illustrative sources of $C_3$ olefins suitable for use in the disclosure herein, either alone or in combination with one or more $C_4$ olefins include, for example, untreated $C_3$ rich refinery streams such as "dilute" or "refinery grade" propylene from a fluidized catalytic cracker (FCC), a $C_3$ rich stream from a steam cracker, a $C_3$ rich stream from the production of "chemical grade" or "polymer grade" propylene, a $C_3$ rich stream from a refinery gas recovery unit, a $C_3$ rich stream from a propane dehydrogenation unit, a $C_3$ rich stream from a gas-to-olefin (GTO) unit or a Fisher-Tropsch unit, and a $C_3$ rich return stream from a polypropylene producing unit.

The feed mixture may comprise a mixed $C_3/C_4$ FCC light olefin stream diluted with one or more paraffins. Such FCC light olefin streams may comprise ethane, ethylene, propane, propylene, isobutane, n-butane, butenes, pentanes, and other optional components. A $C_3$ rich FCC stream may comprise ethane, ethylene, propane, propylene, isobutane, isobutene, and other optional components.

Any of the feed mixtures here may comprise a diluent, such as a saturated hydrocarbon diluent, which may improve reactor continuity. Saturated hydrocarbon diluents may comprise any suitable hydrocarbon such as alkanes or a mixture comprising at least one alkane. The alkanes may be represented by the general formula $C_nH_{2n+2}$, wherein n is a integer from 1 to 20, or from 1 to 10, or from 1 to 5, or from 3 to 4. Examples may include methane, ethane, propane, butane, pentane, and mixtures thereof. According to any embodiment herein, the feed mixture may comprise at least about 30 wt. % or at least about 50 wt. % of the saturated hydrocarbon diluent by mass. Alternately, a saturated hydrocarbon diluent may be fed to the zeolite catalyst separately from the feed mixture. When fed separately, the saturated hydrocarbon diluent may be fed in an amount similar to or different than that present when the saturated hydrocarbon diluent is already included in the feed mixture.

Selectivity Enhancement for $C_{10}$-$C_{13}$ Olefin Oligomers

Having described above suitable zeolite catalysts and oligomerization reaction conditions for producing a product mixture comprising a plurality of olefin oligomers, further description directed to enhanced selectivity production of $C_{10}$-$C_{13}$ olefin oligomers, including those having an average branching index of about 2.2 or less, particularly at least $C_{12}$ olefin oligomers within the product mixture having an average branching index of about 2.2 or less, will now be described in further detail. Unexpectedly, numerous parameters may be leveraged to obtain enhanced selectivity for formation of olefin oligomers within this size range, accompanied by the ability to further tailor the composition of the product mixture as well.

Certain zeolite catalysts may encourage formation of olefin oligomers having an average branching index of about 2.2 or less simply by virtue of their particular framework structure. Zeolite catalysts having an MTT (e.g., ZSM-23) or TON framework represent illustrative examples of zeolite catalysts capable of affording enhanced selectivity production of $C_{10}$-$C_{13}$ olefin oligomers while also maintaining an average branching index of about 2.2 or less for at least $C_{12}$ olefin oligomers, particularly without modifying the zeolite framework. In particular, various methods of the present disclosure may comprise contacting a feed mixture comprising at least one $C_3$ olefin and/or at least one $C_4$ olefin with a zeolite catalyst having an MTT or TON framework under oligomerization reaction conditions effective to form a product mixture; obtaining a plurality of olefin oligomers within the product mixture, in which the olefin oligomers comprise at least about 10% $C_{12}$ olefin oligomers, based on total olefin oligomers by mass, and at least about 25% $C_{10}$-$C_{13}$ olefin oligomers, based on total olefin oligomers by mass, and at least the $C_{12}$ olefin oligomers have an average branching index of about 2.2 or less, particularly about 1.3 to about 2.0; and optionally, separating the $C_{10}$-$C_{13}$ olefin oligomers, or a portion thereof, from the product mixture. Surprisingly, zeolite catalysts having an MTT framework may support formation of lightly branched olefins under considerably higher WHSV values than can TON framework zeolite catalysts. Optionally, the MTT or TON framework zeolite catalyst may be modified in one or more of the manners discussed above to improve the selectivity toward formation of the $C_{10}$-$C_{13}$ olefin oligomers or higher olefin oligomers formable therefrom.

Certain zeolite catalysts may encourage more selective formation of olefin oligomers within a specified size range by virtue of modifying their framework structure in one or more suitable ways. For example, zeolite catalysts having an MTT, MWW, MRE, MFI, MTW, or TON framework may be suitably modified (e.g., steaming, adsorbing an organic acid (e.g., oxalic acid), impregnating with a transition metal (e.g., Y), coking, impregnating with NiO, or any combination thereof) to afford enhanced selectivity formation of $C_{10}$-$C_{13}$ olefin oligomers. In particular, various methods of the present disclosure may comprise contacting a feed mixture comprising at least one $C_3$ olefin and/or at least one $C_4$ olefin with a zeolite catalyst having a framework selected from the group consisting of MTT, MWW, MRE, MTW, TON, and any combination thereof under oligomerization reaction conditions effective to form a product mixture; obtaining a plurality of olefin oligomers within the product mixture, in which the olefin oligomers comprise at least about 10% $C_{12}$ olefin oligomers, based on total olefin oligomers by mass, and at least about 25% $C_{10}$-$C_{13}$ olefin oligomers, based on total olefin oligomers by mass, and optionally separating the $C_{10}$-$C_{13}$ olefin oligomers, or a portion thereof, from the product mixture. Optionally, at least the $C_{12}$ olefin oligomers may have an average branching index of about 2.2 or less, particularly about 1.3 to about 2.0. The zeolite catalyst is modified by steaming, modified with an organic acid, modified with a transition metal, modified with coke, modified by impregnation with NiO, or any combination thereof. Surprisingly, zeolite catalysts having an MTT or TON framework may feature even further enhanced selectivity toward production of $C_{10}$-$C_{13}$ olefin oligomers when suitably modified. Particularly suitable zeolite catalysts may be doubly modified by steaming and an additional modification selected from the group consisting of modified with an organic acid (e.g., oxalic acid), modified with a transition metal (e.g., Y), and any combination thereof.

In more particular examples, the methods may comprise contacting a feed mixture comprising at least one $C_3$ olefin and/or at least one $C_4$ olefin with a zeolite catalyst having an MTT framework under oligomerization reaction conditions effective to form a product mixture; obtaining a plurality of olefin oligomers within the product mixture, in which the olefin oligomers comprise at least about 25% $C_{10}$-$C_{13}$ olefin oligomers, based on total olefin oligomers by mass, and at least the $C_{12}$ olefin oligomers of the $C_{10}$-$C_{13}$ olefin oligomers have an average branching index ranging from about 1.3 to about 2.0; and optionally, separating the $C_{10}$-$C_{13}$ olefin oligomers, or a portion thereof, from the product mixture. The zeolite catalyst may be doubly modified by steaming and an additional modification selected from the group consisting of modified with an organic acid (e.g., oxalic acid), modified with a transition metal (e.g., Y), and any combination thereof. Particular examples of doubly modified zeolite catalysts may include, for example, ZSM-23 that is steamed and modified with oxalic acid and ZSM-23 that is steamed and modified with Y. In particular examples, contacting may take place at a WHSV ranging from about 12 $hr^{-1}$ to about 62 $hr^{-1}$, with at least one of the WHSV and temperature being selected to provide an average branching index of at least the $C_{12}$ olefin oligomers ranging from about 1.3 to about 1.9 and a selectivity for $C_{10}$-$C_{13}$ olefin oligomers ranging from about 30% to about 55% or about 32% to about 54%.

Certain zeolite catalysts may encourage formation of olefin oligomers having an average branching index of about 2.2 or less, particularly at least $C_{12}$ olefin oligomers within the product mixture having an average branching index of about 2.2 or less, through use in a sequenced arrangement, such as a stacked bed configuration, with another zeolite catalyst or a non-zeolite catalyst. The zeolite catalyst used in such sequenced arrangements may comprise an MTT zeolite, such as ZSM-23, for example. In particular, various methods of the present disclosure may comprise contacting a feed mixture comprising at least one $C_3$ olefin and/or at least one $C_4$ olefin with a zeolite catalyst in a sequenced arrangement, the sequenced arrangement comprising an MTT zeolite as a first component and a second component selected from the group consisting of an MFS framework zeolite and a supported NiO catalyst; obtaining a plurality of olefin oligomers within the product mixture, in which the olefin oligomers comprise at least about 10% $C_{12}$ olefin oligomers, based on total olefin oligomers by mass, and at least about 25% $C_{10}$-$C_{13}$ olefin oligomers, based on total olefin oligomers by mass, and at least the $C_{12}$ olefin oligomers have an average branching index of about 2.2 or less, particularly about 1.3 to about 2.0; and optionally, separating the $C_{10}$-$C_{13}$ olefin oligomers, or a portion thereof, from the product mixture. In illustrative embodiments, the sequenced arrangement may comprise the first component and the second component arranged in series in a single reactor or in separate reactors fluidly connected in series, or the sequenced arrangement may comprise a stacked bed arrangement of the first component and the second component in a single reactor. The second component or the first component in the sequenced arrangement may be contacted first by the feed mixture. Preferably, the MTT zeolite may be contacted second by the feed mixture or a partially reacted form thereof.

Alternately, an MTT zeolite and an MFS zeolite may be contacted with a feed mixture in parallel to afford a plurality of olefin oligomers having a low branching index. Such methods may comprise contacting a first portion of a feed mixture comprising at least one $C_3$ olefin and/or at least one $C_4$ olefin with a zeolite catalyst having an MTT framework in a first reactor under oligomerization reaction conditions effective to form a first intermediate product;

contacting a second portion of the feed mixture with a zeolite catalyst having an MFS framework in a second reactor under oligomerization reaction conditions effective to form a second intermediate product; wherein the first reactor and the second reactor are in parallel with one another; and blending at least a portion of the first intermediate product with at least a portion of the second intermediate product to form a product mixture comprising a plurality of olefin oligomers, the olefin oligomers comprising at least about 10% $C_{12}$ olefin oligomers, based on total olefin oligomers by mass, and the $C_{12}$ olefin oligomers having an average branching index, as measured by GC, of about 2.2 or less, such as about 1.3 to about 2.0.

Surprisingly, it has been discovered that the average branching index of at least $C_{12}$ olefin oligomers and the selectivity for $C_{10}$-$C_{13}$ olefin oligomers within the plurality of olefin oligomers is a function of the percentage of conversion of the feed mixture. The WHSV and temperature associated with the oligomerization reaction conditions, in turn, may determine the percentage conversion of the feed mixture. Accordingly, the WHSV and temperature may directly influence the average branching index of at least the $C_{12}$ olefin oligomers and may be varied as needed to target a desired average branching index for at least $C_{12}$ olefin oligomers and/or a desired selectivity for $C_{10}$-$C_{13}$ olefin oligomers. More specifically, such methods of the present disclosure may comprise contacting a feed mixture comprising at least one $C_3$ olefin and/or at least one $C_4$ olefin with a zeolite catalyst under oligomerization reaction conditions effective to form a product mixture comprising a plurality of olefin oligomers; specifying a targeted average branching index of at least $C_{12}$ olefin oligomers and/or a targeted selectivity for $C_{10}$-$C_{13}$ olefin oligomers; and selecting at least one of a weight hour space velocity (WHSV) and temperature sufficient to achieve a percentage of conversion of the at least one $C_3$ olefin and/or at least one $C_4$ olefin to afford the targeted average branching index of at least $C_{12}$ olefin oligomers and/or the targeted selectivity for $C_{10}$-$C_{13}$ olefin oligomers. The average branching index of at least $C_{12}$ olefin oligomers and the selectivity for $C_{10}$-$C_{13}$ olefin oligomers within the plurality of olefin oligomers are correlated to one another as a function of percentage of conversion of the at least one $C_3$ olefin and/or at least one $C_4$ olefin, thereby allowing these parameters to be varied by altering at least one of WHSV and temperature. The average branching index for at least the $C_{12}$ olefin oligomers may be about 2.2 or less. In particular examples, the selectivity for $C_{10}$-$C_{13}$ olefin oligomers may be about 30% to about 55% or about 32% to about 54%, based on total olefin oligomers by mass, and/or at least the $C_{12}$ olefin oligomers may have an average branching index ranging from about 1.3 to about 2.0. Preferably, the zeolite catalyst may comprise a MTT zeolite catalyst or a modified MTT zeolite catalyst.

Further surprisingly, the selectivity for producing $C_{10}$-$C_{13}$ olefin oligomers may be modified while keeping the selectivity for $C_{12}$ olefin oligomers substantially constant (e.g., about 5% or less selectivity variance) by altering at least one of the WHSV and temperature. More specifically, such methods of the present disclosure may comprise: contacting a feed mixture comprising at least one $C_3$ olefin and/or at least one $C_4$ olefin with a zeolite catalyst under oligomerization reaction conditions effective to form a product mixture comprising a plurality of olefin oligomers; specifying a targeted selectivity for $C_{10}$-$C_{14}$ olefin oligomers; and selecting at least one of a weight hour space velocity (WHSV) and temperature sufficient to achieve a percentage of conversion of the at least one $C_3$ olefin and/or at least one $C_4$ olefin to afford the targeted selectivity for $C_{10}$-$C_{14}$ olefin oligomers. A selectivity for $C_{10}$-$C_{14}$ olefin oligomers within the plurality of olefin oligomers is a function of percentage of conversion of the at least one $C_3$ olefin and/or at least one $C_4$ olefin, and a selectivity for $C_{12}$ olefin oligomers varies by about 5% or less as a function of percentage of conversion of the at least one $C_3$ olefin and/or at least one $C_4$ olefin at a fixed composition of the feed mixture. In more particular examples, the selectivity for $C_{10}$-$C_{14}$ olefin oligomers may be about 32% to about 54% based on total olefin oligomers by mass, and/or at least the $C_{12}$ olefin oligomers may have an average branching index ranging from about 1.3 to about 2.0. Preferably, the zeolite catalyst may comprise a MTT zeolite catalyst or a modified MTT zeolite catalyst.

The selectivity for producing $C_{12}$ olefin oligomers may be further modified by altering the amount of $C_4$ olefins within the feed mixture. More specifically, such methods may comprise: contacting a feed mixture comprising at least one $C_3$ olefin and/or at least one $C_4$ olefin with a zeolite catalyst under oligomerization reaction conditions effective to form a product mixture comprising a plurality of olefin oligomers; specifying a targeted selectivity for $C_{12}$ olefin oligomers within the plurality of olefin oligomers; and selecting an amount of $C_4$ olefin in the feed mixture effective to produce the targeted selectivity for $C_{12}$ olefin oligomers. The selectivity for $C_{12}$ olefin oligomers varies by about 10% or less as a function of percentage of conversion of the at least one $C_3$ olefin and/or at least one $C_4$ olefin at a fixed composition of the feed mixture. The methods may further comprise: specifying a targeted percentage of conversion of the at least one $C_3$ olefin and/or at least one $C_4$ olefin; and selecting at least one of a weight hour space velocity (WHSV) and temperature sufficient to achieve the targeted percentage of conversion of the at least one $C_3$ olefin and/or at least one $C_4$ olefin, the targeted percentage of conversion of the at least one $C_3$ olefin and/or at least one $C_4$ olefin affording a specified selectivity for $C_{10}$-$C_{14}$ olefin oligomers within the plurality of olefin oligomers. Accordingly, for a fixed composition of the feed mixture, at least one of the WHSV and temperature may be varied to modify the selectivity for production of $C_{10}$-$C_{13}$ olefin oligomers, and the selectivity for formation of $C_{12}$ olefin oligomers may be varied by altering the amount of $C_4$ olefins within the feed mixture. At least the $C_{12}$ olefin oligomers may have an average branching index of about 2.2 or less, particularly an average branching index ranging from about 1.3 to about 2.0. Preferably, the zeolite catalyst may comprise a MTT zeolite catalyst or a modified MTT zeolite catalyst.

The methods may further comprise selecting an amount of isobutylene in the feed mixture effective to produce the targeted selectivity for $C_{12}$ olefin oligomers. Surprisingly, isobutylene may be included in the feed mixture without significantly altering the average branching index of the olefin oligomers that are produced, particularly at least the $C_{12}$ olefin oligomers. Accordingly, $C_{12}$ olefin oligomers having an average branching index ranging from about 1.3 to about 2.0 may be produced in the presence of isobutylene within the feed mixture as well.

Any combination of $C_3$ and $C_4$ olefins may be utilized in the feed mixture in conjunction with the foregoing. In some embodiments, the feed mixture may lack a $C_3$ olefin, including embodiments in which olefin content of the feed mixture consists essentially of one or more $C_4$ olefins, particularly one of more linear butenes, optionally in combination with a saturated hydrocarbon diluent. Particular examples of feed mixtures suitable for use in conjunction with the foregoing include, for example, those comprising or consisting essentially of at least one linear butene and butane; and at least one linear butene, isobutylene, and butane. Butane or a similar saturated hydrocarbon diluent may be present in an amount such that the feed mixture has an olefinicity of about 80 wt. % or less, or about 70 wt. % or less, or about 50 wt. % or less, based on the weight of olefin molecules relative to all molecules in the feed mixture. That is, particular examples of the feed mixture may comprise about 20 wt. % or more, or about 30 wt. % or more, or about 50 wt. % or more of butane or a similar hydrocarbon diluent.

Methods of the present disclosure may further comprise obtaining unconverted feed mixture comprising at least one $C_3$ olefin and/or at least one $C_4$ olefin and returning the unconverted feed mixture to the zeolite catalyst. In addition, the feed mixture may be partially oligomerized to form at least some olefin oligomers that are smaller than a desired $C_{10}$-$C_{13}$ oligomer size range or a desired $C_{15}$-$C_{18}$ oligomer size range. A recycle stream comprising olefin oligomers that are smaller than a desired oligomer size may be separated from the product mixture, and the recycle stream may be subsequently reintroduced to the zeolite catalyst or to the feed mixture. In non-limiting embodiments, $C_8$ olefin oligomers, particularly $C_8$ olefin oligomers having an average branching index ranging from about 1.3 to about 2.0, may be obtained and recycled to afford a larger oligomer size. The recycle stream may be reintroduced directly to the zeolite catalyst or may be recombined with the feed mixture prior to contacting the feed mixture with the zeolite catalyst.

It is to be appreciated that any of the foregoing methods may be practiced in combination with one another. For example contacting a feed mixture with a zeolite catalyst under oligomerization reaction conditions effective to form olefin oligomers comprising at least about 10% $C_{12}$ olefin oligomers having an average branching index of about 2.2 or less and at least about 25% $C_{10}$-$C_{13}$ olefin oligomers, each based on total olefin oligomers by mass, may be further tailored by modifying the zeolite catalyst, altering at least one of the WHSV and temperature of the feed mixture, and/or altering the amount and/or type of $C_4$ olefins in the feed mixture to tailor the selectivity for $C_{10}$-$C_{13}$ olefin oligomers and/or $C_{12}$ olefin oligomers within the product mixture.

Lightly Branched Paraffins

It is to be appreciated that the olefin oligomers disclosed herein may undergo reduction of the olefinic double bond to afford the corresponding lightly branched paraffins, in which the carbon number distribution and the branching index may be largely preserved from that of the olefin oligomers. Such lightly branched paraffins may be used directly as lubricants, drilling fluid additives, heat transfer fluids, fuels or fuel additives, plasticizers, co-monomers, transformer oils, agricultural oils, sealants and mastics, printing inks, mould release agents, or the like. High flash points, low pour points and favorable thermal conductivity may be among desirable features possessed by lightly branched paraffins formed according to the disclosure herein.

Optionally, lightly branched olefin oligomers or lightly branched paraffins formed therefrom may be combined with various blend materials for suitability with a particular end use application. Suitable blend materials follow hereinafter.

Among the blend materials that may be present in combination with lightly branched paraffins and/or lightly branched olefin oligomers to address particular application-specific needs include, for example, base oils, aromatic hydrocarbons, polyalphaolefins, paraffins, esters, ethers, gas-to-liquids base oils, Fischer-Tropsch wax-derived base oils, wax-derived hydroisomerized base oils, silicone oils, antioxidants, corrosion inhibitors, antifoam agents, antiwear agents, dispersants, detergents, viscosity modifiers, and any combination thereof.

A wide range of base oils are known in the art. Base oils that may be useful in the present disclosure include natural oils, mineral oils and synthetic oils, and unconventional oils (or mixtures thereof), any of which can be used unrefined, refined, or re-refined, the latter being also known as reclaimed or reprocessed oil. Unrefined oils include those obtained directly from a natural or synthetic source and used without added purification. These include shale oil obtained directly from retorting operations, petroleum oil obtained directly from primary distillation, and ester oil obtained directly from an esterification process. Refined oils are similar to the oils discussed for unrefined oils except refined oils are subjected to one or more purification steps to improve at least one heat transfer fluid base oil property. One skilled in the art will be familiar with many purification processes. Such purification processes may include solvent extraction, secondary distillation, acid extraction, base extraction, filtration, percolation, and any combination thereof. Re-refined oils are obtained by processes analogous to refined oils but using an oil that has been previously used as a feed stock.

Groups I, II, III, IV and V are broad base oil stock categories developed and defined by the American Petroleum Institute (API Publication 1509; www.API.org) to create guidelines for product specifications. Group I base stocks have a viscosity index of between about 80 to 120 and contain greater than about 0.03% sulfur and/or less than about 90% saturates. Group II base stocks have a viscosity index of between about 80 to 120, and contain less than or equal to about 0.03% sulfur and greater than or equal to about 90% saturates. Group III base stocks have a viscosity index greater than about 120 and contain less than or equal to about 0.03% sulfur and greater than about 90% saturates. Group IV base stocks includes polyalphaolefins (PAOs). Group V base stocks includes base stocks not included in Groups I-IV. The table below summarizes properties of each of these five groups.

| | Base Oil Properties | | |
|---|---|---|---|
| | Saturates | Sulfur | Viscosity Index |
| Group I | <90 and/or | >0.03% and | ≥80 and <120 |
| Group II | ≥90 and | ≤0.03% and | ≥80 and <120 |
| Group III | ≥90 and | ≤0.03% and | ≥120 |
| Group IV | | polyalphaolefins (PAOs) | |
| Group V | All other base oil stocks not included in Groups I, II, III or IV | | |

Natural oils include animal oils, vegetable oils (castor oil and lard oil, for example), and mineral oils. Animal and vegetable oils possessing favorable thermal oxidative stability can be used. Of the natural oils, mineral oils are preferred. Mineral oils vary widely as to their crude source, for example, as to whether they are paraffinic, naphthenic, or mixed paraffinic-naphthenic. Oils derived from coal or shale may also be useful. Natural oils also may vary as to the method used for their production and purification, for example, their distillation range and whether they are straight run or cracked, hydrorefined, or solvent extracted.

Group II and/or Group III hydroisomerized or hydrocracked base stocks, including synthetic oils such as alkyl aromatics and synthetic esters, are also well known base stock oils that may be used in the disclosure herein.

Synthetic oils include hydrocarbon oil. Hydrocarbon oils include oils such as polymerized and interpolymerized olefins (polybutylenes, polypropylenes, propylene isobutylene copolymers, ethylene-olefin copolymers, and ethylene-alphaolefin copolymers, for example). Polyalphaolefin (PAO) oil base stocks are commonly used synthetic hydrocarbon oil. By way of example, PAOs derived from $C_8$, $C_{10}$, $C_{12}$, or $C_{14}$ olefins or mixtures thereof may be utilized, as described in U.S. Pat. Nos. 4,956,122; 4,827,064; and 4,827,073, each of which is incorporated herein by reference.

Other useful oil base stocks include wax isomerate base stocks and base oils, comprising hydroisomerized waxy stocks (e.g., waxy stocks such as gas oils, slack waxes, fuels hydrocracker bottoms, and the like), hydroisomerized Fischer-Tropsch waxes, gas-to-liquids (GTL) base stocks and base oils, and other wax isomerate hydroisomerized base stocks and base oils, or mixtures thereof. Fischer-Tropsch waxes, the high boiling point residues of a Fischer-Tropsch synthesis, are highly paraffinic hydrocarbons with very low sulfur content. The hydroprocessing used for the production of such base stocks may use an amorphous hydrocracking/hydroisomerization catalyst, such as one of the specialized lube hydrocracking (LHDC) catalysts or a crystalline hydrocracking/hydroisomerization catalyst, preferably a zeolitic catalyst.

Gas-to-liquids (GTL) base oils, Fischer-Tropsch wax-derived base oils, and other wax-derived hydroisomerized (wax isomerate) base oils may be advantageously used in the present disclosure, and may have useful kinematic viscosities at 100° C. of about 3 cSt to about 50 cSt, preferably about 3 cSt to about 30 cSt, more preferably about 3.5 cSt to about 25 cSt, as exemplified by GTL 4 with kinematic viscosity of about 4.0 cSt at 100° C. and a viscosity index of about 141. These gas-to-liquids (GTL) base oils, Fischer-Tropsch wax-derived base oils, and other wax-derived hydroisomerized base oils may have useful pour points of about −20° C. or lower, and under some conditions may have advantageous pour points of about −25° C. or lower, with useful pour points of about −30° C. to about −40° C. or lower. Useful compositions of gas-to-liquids (GTL) base oils, Fischer-Tropsch wax-derived base oils, and wax-derived hydroisomerized base oils are recited in U.S. Pat. Nos. 6,080,301; 6,090,989; and 6,165,949, for example, and are incorporated herein in their entirety by reference.

Esters may comprise a useful base stock. Additive solvency and seal compatibility characteristics may be secured by the use of esters such as the esters of dibasic acids with monoalkanols and the polyol esters of monocarboxylic acids. Esters of the former type include, for example, the esters of dicarboxylic acids such as phthalic acid, succinic acid, alkyl succinic acid, alkenyl succinic acid, maleic acid, azelaic acid, suberic acid, sebacic acid, fumaric acid, adipic acid, linoleic acid dimer, malonic acid, alkyl malonic acid, alkenyl malonic acid, and the like, with a variety of alcohols such as butyl alcohol, hexyl alcohol, dodecyl alcohol, 2-ethylhexyl alcohol, and the like. Specific examples of these types of esters include dibutyl adipate, di-(2-ethylhexyl) sebacate, di-n-hexyl fumarate, dioctyl sebacate, diisooctyl azelate, diisodecyl azelate, dioctyl phthalate, didecyl phthalate, dieicosyl sebacate, and the like.

Base oils suitable for use in the present disclosure may include any of the variety of oils corresponding to API Group I, Group II, Group III, Group IV, and Group V oils, and mixtures thereof, preferably API Group II, Group III, Group IV, and Group V oils, and mixtures thereof, more preferably Group III, Group IV, and Group V base oils, and mixtures thereof. Minor quantities of Group I base stock, such as the amount used to dilute additives for blending into formulated lube oil products, can also be used. Even in regard to the Group II stocks, it is preferred that the Group II stock be in the higher quality range associated with that stock, such as a Group II base stock having a viscosity index in the range 100<VI<120.

The base oil may constitute a minor or major component in a blend of the present disclosure and may be present in an amount ranging from about 50 to about 99 wt. %, preferably from about 70 to about 95 wt. %, and more preferably from about 85 to about 95 wt. %, based on the total weight of the composition, or the base oil may be present in an amount of about 10 wt. % or below. The base oil conveniently has a kinematic viscosity, according to ASTM standards, of about 2.5 cSt to about 12 cSt (or mm$^2$/s) at 100° C. and preferably of about 2.5 cSt to about 9 cSt (or mm$^2$/s) at 100° C. Mixtures of synthetic and natural base oils may be used if desired. Bi-modal mixtures of Group I, II, III, IV, and/or V base stocks may be used, if desired.

The blends of the present disclosure may additionally contain one or more commonly used performance additives including but not limited to antioxidants, corrosion inhibitors, antifoam agents, and others. These additives are commonly delivered with varying amounts of diluent oil, which may range from 5 wt. % to 50 wt. %, or about 10 wt. % or below of the blend. The additives useful in this disclosure do not have to be soluble in the blend. The types and quantities of performance additives used in the blends of the present disclosure are not limited by the examples shown herein as illustrations.

The blends may include at least one antioxidant Antioxidants retard the oxidative degradation of fluids during service. Such degradation may result in deposits on metal surfaces, the presence of sludge, or a viscosity increase in the heat transfer fluid. One having ordinary skill in the art will appreciate that a wide variety of oxidation inhibitors may be useful in blends comprising a lightly branched paraffin.

The blends may include at least one corrosion inhibitor. Corrosion inhibitors are used to reduce the degradation of metallic parts that are in contact with the blends. Corrosion inhibitors are additives that protect metal surfaces against chemical attack by water or other contaminants. A wide variety of corrosion inhibitors are commercially available. As used herein, corrosion inhibitors include antirust additives and metal deactivators. Suitable corrosion inhibitors also include aryl thiazines, alkyl substituted dimercaptothiodiazoles, alkyl substituted dimercaptothiadiazoles, and mixtures thereof.

One type of suitable corrosion inhibitor is a polar compound that wets the metal surface preferentially, protecting it with a film of oil. Another type of corrosion inhibitor absorbs water by incorporating it in a water-in-oil emulsion so that only the oil touches the metal surface. Yet another type of corrosion inhibitor chemically adheres to the metal to produce a non-reactive surface. Examples of suitable additives include zinc dithiophosphates, metal phenolates, basic metal sulfonates, fatty acids and amines. Such additives may be used in an amount of about 0.01 wt. % to 5 wt. %, preferably about 0.01 to 1.5 wt. %, more preferably 0.01 to 0.2 wt. %, still more preferably 0.01 to 0.1 wt. % (on an as-received basis) based on the total weight of the blend.

Antifoam agents may advantageously be added to blends. These agents retard the formation of stable foams. Silicones and organic polymers are typical antifoam agents. For example, polysiloxanes, such as silicon oil or polydimethylsiloxane, provide antifoam properties. Antifoam agents are commercially available and may be used in conventional minor amounts along with other additives such as demulsifiers; usually the amount of these additives combined is less than 1 wt. % and often less than 0.1 wt. %. In an embodiment, such additives may be used in an amount of about 0.01 to 5 wt. %, preferably 0.1 to 3 wt. %, and more preferably about 0.5 to 1.5 wt. %.

The blends may include at least one antiwear agent. Examples of suitable antiwear agents include oil soluble amine salts of phosphorus compounds, sulphurized olefins, metal dihydrocarbyldithio-phosphates (such as zinc dialkyldithiophosphates), thiocarbamate-containing compounds, such as thiocarbamate esters, thiocarbamate amides, thiocarbamic ethers, alkylene-coupled thiocarbamates, and bis (S-alkyldithiocarbamyl) disulphides.

Antiwear agents used in the blends may be ashless or ash-forming in nature. Preferably, the antiwear agent is ashless. So-called ashless antiwear agents are materials that form substantially no ash upon combustion. For example, non-metal-containing antiwear agents are considered ashless.

The blends of the present disclosure may additionally contain one or more of the other commonly used performance additives including but not limited to dispersants, detergents, viscosity modifiers, metal passivators, ionic liquids, extreme pressure additives, anti-seizure agents, wax modifiers, fluid-loss additives, seal compatibility agents, lubricity agents, anti-staining agents, chromophoric agents, defoamants, demulsifiers, emulsifiers, densifiers, wetting agents, gelling agents, tackiness agents, colorants, and others. For a review of many commonly used additives, see Klamann in Lubricants and Related Products, Verlag Chemie, Deerfield Beach, FL; ISBN 0-89573-177-0; see also U.S. Pat. No. 7,704,930, the disclosure of which is incorporated herein by reference in its entirety. These additives are commonly delivered with varying amounts of diluent oil, which may range from 5 wt. % to 50 wt. %.

The blends may include at least one dispersant. During electrical apparatus component operation, oil-insoluble oxidation byproducts are produced. Dispersants help keep these byproducts in solution, thus diminishing their deposition on metal surfaces. Dispersants used in the formulation of the heat transfer fluids may be ashless or ash-forming in nature. Preferably, the dispersant is ashless. So called ashless dispersants are organic materials that form substantially no ash upon combustion. For example, non-metal-containing or borated metal-free dispersants are considered ashless.

Suitable dispersants typically contain a polar group attached to a relatively high molecular weight hydrocarbon chain. The polar group typically contains at least one element of nitrogen, oxygen, or phosphorus. Typical hydrocarbon chains contain 50 to 400 carbon atoms.

The blends may include at least one detergent Illustrative detergents useful in this disclosure include, for example, alkali metal detergents, alkaline earth metal detergents, or mixtures of one or more alkali metal detergents and one or more alkaline earth metal detergents. A typical detergent is an anionic material that contains a long chain hydrophobic portion of the molecule and a smaller anionic or oleophobic hydrophilic portion of the molecule. The anionic portion of the detergent is typically derived from an organic acid such as a sulfur acid, carboxylic acid (e.g., salicylic acid), phosphorous acid, phenol, or mixtures thereof. The counterion is typically an alkaline earth or alkali metal.

Viscosity modifiers (also known as viscosity index improvers (VI improvers), and viscosity improvers) can be included in the blends of this disclosure. Viscosity modifiers may provide blends with high and low temperature operability. These additives impart shear stability at elevated temperatures and acceptable viscosity at low temperatures. Suitable viscosity modifiers include high molecular weight hydrocarbons, polyesters and viscosity modifier dispersants that function as both a viscosity modifier and a dispersant. Typical molecular weights of these polymers are about 10,000 to 1,500,000, more typically about 20,000 to 1,200,000, and even more typically between about 50,000 and 1,000,000.

Examples of suitable viscosity modifiers include linear or star-shaped polymers and copolymers of methacrylate, butadiene, olefins, or alkylated styrenes. Polyisobutylene is a commonly used viscosity modifier. Another suitable viscosity modifier is polymethacrylate (copolymers of various chain length alkyl methacrylates, for example), some formulations of which also serve as pour point depressants. Other suitable viscosity modifiers include copolymers of ethylene and propylene, hydrogenated block copolymers of styrene and isoprene, and polyacrylates (copolymers of various chain length acrylates, for example). Specific examples include styrene-isoprene or styrene-butadiene based polymers of 50,000 to 200,000 molecular weight The blends may include at least one metal passivator. The metal passivators/deactivators include, for example, benzotriazole, tolyltriazole, 2-mercaptobenzothiazole, dialkyl-2,5-dimercapto-1,3,4-thiadiazole; N,N'-disalicylideneethylenediamine, N,N'-disalicylidenepropylenediamine; zinc dialkyldithiophosphates and dialkyl dithiocarbamates. The metal passivator concentration in the blends of this disclosure can range from about 0.01 to about 5.0 wt. %, preferably about 0.01 to 3.0 wt. %, and more preferably from about 0.01 wt. % to about 1.5 wt. %, based on the total weight of the blend.

Ionic liquids are so-called salt melts, which are preferably liquid at room temperature and/or by definition have a melting point less than 100° C. They have almost no vapor pressure and therefore have no cavitation properties. In addition, through the choice of the cations and anions in the ionic liquids, the lifetime of the blend may be increased, and by adjusting the electric conductivity, these liquids can be used in equipment in which there is an electric charge buildup, such as electric vehicle components. Suitable cations for ionic liquids include a quaternary ammonium cation, a phosphonium cation, an imidazolium cation, a pyridinium cation, a pyrazolium cation, an oxazolium cation, a pyrrolidinium cation, a piperidinium cation, a thiazolium cation, a guanidinium cation, a morpholinium cation, a trialkylsulfonium cation or a triazolium cation.

In electrical apparatus components, static electricity is generated, especially when the blend is in use. To reduce that hazard, a conductive antistatic additive can be added to and distributed throughout the blends. The blends thereby may avoid reduction in its performance associated with local breakdown of the base stock and safety problems from static electric build-up.

A class of products called "antistatic fluids" or "antistatic additives," which also are petroleum distillates, can be added to adjust the conductivity of blends to safe levels, such as at or above 100 pico-siemens per meter conductivity. Very small quantities of these antistatic fluids are required to raise the conductivity to the desired levels, such as 10 to 30 milliliters per 1,000 gallons of hydrocarbon.

Conventional pour point depressants (also known as lube oil flow improvers) may be added to the blends of the present disclosure. Pour point depressants may be added to the blends to lower the minimum temperature at which the fluid will flow or can be poured. Examples of suitable pour point depressants include polymethacrylates, polyacrylates, polyarylamides, condensation products of haloparaffin waxes and aromatic compounds, vinyl carboxylate polymers, and terpolymers of dialkylfumarates, vinyl esters of fatty acids and allyl vinyl ethers. U.S. Pat. Nos. 1,815,022; 2,015,748; 2,191,498; 2,387,501; 2,655,479; 2,666,746; 2,721,877; 2,721,878; and 3,250,715, each of which is incorporated herein by reference, describe useful pour point depressants and/or the preparation thereof. Such additives may be used in an amount of about 0.01 to 5 wt. %, preferably 0.1 to 3 wt. %, and more preferably about 0.5 to 1.5 wt. %.

The blends can include at least one seal compatibility agent. Seal compatibility agents help to swell elastomeric seals by causing a chemical reaction in the fluid or physical change in the elastomer. Suitable seal compatibility agents for blends include organic phosphates, aromatic esters, aromatic hydrocarbons, esters (butylbenzyl phthalate, for example), and polybutenyl succinic anhydride. Such additives may be used in an amount of about 0.01 to 5 wt. %, preferably 0.1 to 3 wt. %, and more preferably about 0.5 to 1.5 wt. %.

The blends can include at least one friction modifier. A friction modifier is any material or materials that can alter the coefficient of friction of a surface. Friction modifiers, also known as friction reducers, or lubricity agents or oiliness agents, and other such agents that change the ability of base oils, formulated blends, or functional fluids, to modify the coefficient of friction of a surface may be effectively used in combination with the base oils or blends of the present disclosure if desired. Friction modifiers that lower the coefficient of friction are particularly advantageous in combination with the base oils and blends of this disclosure.

Illustrative friction modifiers may include, for example, organometallic compounds or materials, or mixtures thereof. Illustrative organometallic friction modifiers useful in the blends of this disclosure include, for example, molybdenum amine, molybdenum diamine, an organotungstenate, a molybdenum dithiocarbamate, molybdenum dithiophosphates, molybdenum amine complexes, molybdenum carboxylates, the like, and mixtures thereof. Similar tungsten-based compounds may be preferable.

Other illustrative friction modifiers useful in the blends of this disclosure include, for example, alkoxylated fatty acid esters, alkanolamides, polyol fatty acid esters, borated glycerol fatty acid esters, fatty alcohol ethers, and mixtures thereof.

The blends can include at least one extreme pressure agent (EP). EP agents that are soluble in the oil include sulphur- and chlorosulphur-containing EP agents, chlorinated hydrocarbon EP agents and phosphorus EP agents. Examples of such EP agents include chlorinated wax; sulphurised olefins (such as sulphurised isobutylene), organic sulphides and polysulphides such as dibenzyldisulphide, bis-(chlorobenzyl)disulphide, dibutyl tetrasulphide, sulphurised methyl ester of oleic acid, sulphurised alkylphenol, sulphurised dipentene, sulphurised terpene, and sulphurised Diels-Alder adducts; phosphosulphurised hydrocarbons such as the reaction product of phosphorus sulphide with turpentine or methyl oleate; phosphorus esters such as the dihydrocarbon and trihydrocarbon phosphites, including dibutyl phosphite, diheptyl phosphite, dicyclohexyl phosphite, pentylphenyl phosphite; dipentylphenyl phosphite, tridecyl phosphite, distearyl phosphite and polypropylene substituted phenol phosphite; metal thiocarbamates such as zinc dioctyldithiocarbamate and barium heptylphenol diacid; amine salts of alkyl and dialkylphosphoric acids or derivatives; and mixtures thereof (as described in U.S. Pat. No. 3,197,405, which is incorporated herein by reference).

Extreme pressure agents may be used in an amount of about 0.01 to 5 wt. %, preferably 0.01 to 1.5 wt. %, more preferably 0.01 to 0.2 wt. %, and still more preferably 0.01 to 0.1 wt. % (on an as-received basis) based on the total weight of the blends.

Embodiments disclosed herein include:

A. Methods for forming lightly branched olefins with a doubly modified MTT zeolite catalyst. The methods comprise: contacting a feed mixture comprising at least one $C_3$ olefin and/or at least one $C_4$ olefin with a zeolite catalyst having an MTT framework under oligomerization reaction conditions effective to form a product mixture; wherein the zeolite catalyst is doubly modified by steaming and an additional modification selected from modified with an organic acid and modified with a transition metal; and obtaining a plurality of olefin oligomers within the product mixture, the olefin oligomers comprising at least about 25% $C_{10}$-$C_{13}$ olefin oligomers in total, based on total olefin oligomers, and at least $C_{12}$ olefin oligomers of the $C_{10}$-$C_{13}$ olefin oligomers having an average branching index ranging from about 1.3 to about 2.0.

B. Methods for forming lightly branched olefins by adjusting weight hour space velocity. The methods comprise: contacting a feed mixture comprising at least one $C_3$ olefin and/or at least one $C_4$ olefin with a zeolite catalyst under oligomerization reaction conditions effective to form a product mixture comprising a plurality of olefin oligomers; wherein an average branching index of $C_{12}$ olefin oligomers and a selectivity for $C_{10}$-$C_{13}$ olefin oligomers, optionally $C_{10}$-$C_{14}$ olefin oligomers, within the plurality of olefin oligomers are correlated to one another as a function of percentage of conversion of the at least one $C_3$ olefin and/or at least one $C_4$ olefin; specifying a targeted average branching index of $C_{12}$ olefin oligomers and/or a targeted selectivity for $C_{10}$-$C_{13}$ olefin oligomers; and selecting a weight hour space velocity (WHSV) sufficient to achieve a percentage of conversion of the at least one $C_3$ olefin and/or at least one $C_4$ olefin to afford the targeted average branching index of $C_{12}$ olefin oligomers and/or the targeted selectivity for $C_{10}$-$C_{13}$ olefin oligomers.

C. Methods for forming lightly branched olefin oligomers by adjusting extent of feed mixture conversion. The methods comprise: contacting a feed mixture comprising at least one $C_3$ olefin and/or at least one $C_4$ olefin with a zeolite catalyst under oligomerization reaction conditions effective to form a product mixture comprising a plurality of olefin oligomers; wherein a selectivity for $C_{10}$-$C_{14}$ olefin oligomers, optionally $C_{10}$-$C_{13}$ olefin oligomers, within the plurality of olefin oligomers is a function of percentage of conversion of the at least one $C_3$ olefin and/or at least one $C_4$ olefin, and a selectivity for $C_{12}$ olefin oligomers varies by about 5% or less as a function of percentage of conversion of the at least one $C_3$ olefin and/or at least one $C_4$ olefin at a fixed composition of the feed mixture; specifying a targeted selectivity for $C_{10}$-$C_{14}$ olefin oligomers; and selecting a weight hour space velocity (WHSV) sufficient to achieve a percentage of conversion of the at least one $C_3$ olefin and/or at least one $C_4$ olefin to afford the targeted selectivity for $C_{10}$-$C_{14}$ olefin oligomers, optionally $C_{10}$-$C_{13}$ olefin oligomers.

D. Methods for forming lightly branched olefin oligomers by adjusting an amount of $C_4$ olefins in a feed mixture. The methods comprise: contacting a feed mixture comprising at least one $C_3$ olefin and/or at least one $C_4$ olefin with a zeolite catalyst under oligomerization reaction conditions effective to form a product mixture comprising a plurality of olefin oligomers; specifying a targeted selectivity for $C_{12}$ olefin oligomers within the plurality of olefin oligomers; and selecting an amount of $C_4$ olefin in the feed mixture effective to produce the targeted selectivity for $C_{12}$ olefin oligomers; wherein a selectivity for $C_{12}$ olefin oligomers varies by about 10% or less as a function of percentage of conversion of the at least one $C_3$ olefin and/or at least one $C_4$ olefin at a fixed composition of the feed mixture.

E. Compositions comprising lightly branched olefin oligomers. The compositions comprise: a plurality of olefin oligomers having about 8 to about 16 carbon atoms and comprising at least about 70 wt. % Type II and Type IV olefins in total; wherein an average number of methyl branches per carbon atom of the olefin oligomers ranges from about 0.08 to about 0.16.

F. Zeolite catalysts. The zeolite catalysts comprise: ZSM-23 crystallites having a $Si:Al_2$ molar ratio above about 30 and having an average crystallite size of about 0.1 microns or less; wherein the ZSM-23 crystallites are modified by steaming, modified with an organic acid, modified with a transition metal, modified with coke, modified by NiO impregnation, or any combination thereof.

Embodiment A may have one or more of the following additional elements in any combination:

Element 1: wherein the zeolite catalyst is ZSM-23.

Element 2: wherein the organic acid is oxalic acid and the transition metal is yttrium.

Element 3: wherein the feed mixture has an olefinicity of about 80 wt. % or less.

Element 4: wherein the feed mixture consists essentially of at least one linear butene and a saturated hydrocarbon diluent.

Element 5: wherein the feed mixture consists essentially of at least one linear butene, isobutylene and a saturated hydrocarbon diluent.

Element 6: wherein the method further comprises separating a recycle stream from the product mixture, the recycle stream comprising at least one olefin oligomer; and reintroducing the recycle stream to the zeolite catalyst.

Element 7: wherein the oligomerization reaction conditions comprise a temperature of about 150° C. to about 210° C.

Element 8: wherein the oligomerization reaction conditions comprise a weight hour space velocity (WHSV) of about 2 $hr^{-1}$ to about 70 $hr^{-1}$.

Element 9: wherein contacting takes place at a weight hour space velocity (WHSV) ranging from about 12 $hr^{-1}$ to about 62 $hr^{-1}$, and the WHSV is selected to provide an average branching index of the $C_{12}$ olefin oligomers ranging from about 1.4 to about 1.9 and a selectivity for $C_{10}$-$C_{13}$ olefin oligomers ranging from about 30% to about 55%.

Element 10: wherein the olefin oligomers further comprise $C_8$ olefin oligomers having an average branching index ranging from about 1.3 to about 2.0.

Exemplary combinations applicable to A may include, but are not limited to, 1 and 2; 1 and 3; 1, and 4 or 5; 1 and 6; 1 and 7; 1 and 8; 1 and 9; 1 and 10; 2 and 3; 2, and 4 or 5; 2 and 6; 2 and 7; 2 and 8; 2 and 9; 2 and 10 3, and 4 or 5; 3 and 5; 3 and 6; 3 and 7; 3 10 and 8; 3 and 9; 3 and 10; 4 or 5, and 6, 4 or 5, and 7; 4 or 5, and 8; 4 or 5, and 9; 4 or 5, and 10; 6 and 7; 6 and 8; 6 and 9; 6 and 10; 7 and 8; 7 and 9; 7 and 10; 8 and 9; 8 and 10 and 9 and 10.

Embodiment B may have one or more of the following additional elements in any combination:

Element 1: wherein the selectivity for $C_{10}$-$C_{13}$ olefin oligomers, optionally $C_{10}$-$C_{14}$ olefin oligomers, is about 32% to about 54%, based on total olefin oligomers, and/or the $C_{12}$ olefin oligomers have an average branching index ranging from about 1.3 to about 2.0.

Element 2: wherein the zeolite catalyst has an MTT framework or a TON framework.

Element 3: wherein the zeolite catalyst is ZSM-23.

Element 4: wherein the zeolite catalyst is modified by steaming, modified with an organic acid, modified with a transition metal, modified with coke, or any combination thereof.

Element 5: wherein the organic acid is oxalic acid and the transition metal is yttrium.

Element 6: wherein the feed mixture has an olefinicity of about 80 wt. % or less.

Element 7: wherein the feed mixture consists essentially of at least one linear butene and a saturated hydrocarbon diluent.

Element 8: wherein the feed mixture consists essentially of at least one linear butene, isobutylene and a saturated hydrocarbon diluent.

Element 9: wherein the method further comprises separating a recycle stream from the product mixture, the recycle stream comprising at least one olefin oligomer; and reintroducing the recycle stream to the zeolite catalyst.

Exemplary combinations applicable to B may include, but are not limited to: 1 and 2; 1 and 3; 1 and 4; 1, 4 and 5; 1 and 6; 1, and 7 or 8; 1 and 9; 2 and 3; 2 and 4; 2, 4 and 5; 2 and 6; 2, and 7 or 8; 2 and 9; 3 and 4; 3-5; 3 and 6; 3, and 7 or 8; 3 and 9; 4 and 5; 4-6; 4, and 7 or 8; 4 and 9; 6, and 7 or 8; 6 and 9; and 7 or 8, and 9.

Embodiment C may have one or more of the following additional elements in any combination:

Element 1: wherein the selectivity for $C_{10}$-$C_{14}$ olefin oligomers, optionally $C_{10}$-$C_{13}$ olefin oligomers, is about 32% to about 54% based on total olefin oligomers, and/or the $C_{12}$ olefin oligomers have an average branching index ranging from about 1.3 to about 2.0.

Element 2: wherein the zeolite catalyst has an MTT framework or a TON framework.

Element 3: wherein the zeolite catalyst is ZSM-23.

Element 4: wherein the zeolite catalyst is modified by steaming, modified with an organic acid, modified with a transition metal, modified with coke, or any combination thereof.

Element 5: wherein the organic acid is oxalic acid and the transition metal is yttrium.

Element 6: wherein the feed mixture has an olefinicity of about 80 wt. % or less.

Element 7: wherein the feed mixture consists essentially of at least one linear butene and a saturated hydrocarbon diluent.

Element 8: wherein the feed mixture consists essentially of at least one linear butene, isobutylene and a saturated hydrocarbon diluent.

Element 9: wherein the method further comprises separating a recycle stream from the product mixture, the recycle stream comprising at least one olefin oligomer; and reintroducing the recycle stream to the zeolite catalyst.

Exemplary combinations applicable to C may include, but are not limited to: 1 and 2; 1-3; 1 and 4; 1, 2 and 4; 1, 4 and 5; 1 and 6; 1, and 7 or 8; 1 and 9; 2 and 3; 2-4; 2-5; 2 and 6; 2, and 7 or 8; 2 and 9; 4 and 5; 4 and 6; 4, and 7 or 8; 4 and 9; 6, and 7 or 8; 6 and 9; and 7 or 8, and 9.

Embodiment D may have one or more of the following additional elements in any combination:

Element 1: wherein the method further comprises specifying a targeted percentage of conversion of the at least one $C_3$ olefin and/or at least one $C_4$ olefin; and selecting a weight hour space velocity (WHSV) sufficient to achieve the targeted percentage of conversion of the at least one $C_3$ olefin and/or at least one $C_4$ olefin, the targeted percentage of conversion of the at least one $C_3$ olefin and/or at least one $C_4$ olefin affording a specified selectivity for $C_{10}$-$C_{14}$ olefin oligomers within the plurality of olefin oligomers.

Element 2: wherein the feed mixture consists essentially of at least one linear butene, isobutylene and a saturated hydrocarbon diluent, and the method further comprises: selecting an amount of isobutylene in the feed mixture effective to produce the targeted selectivity for $C_{12}$ olefin oligomers.

Element 3: wherein the $C_{12}$ olefin oligomers have an average branching index ranging from about 1.3 to about 2.0.

Element 4: wherein the zeolite catalyst has an MTT framework or a TON framework.

Element 5: wherein the zeolite catalyst is ZSM-23.

Element 6: wherein the zeolite catalyst is modified by steaming, modified with an organic acid, modified with a transition metal, modified with coke, or any combination thereof.

Element 7: wherein the organic acid is oxalic acid and the transition metal is yttrium.

Element 8: wherein the feed mixture has an olefinicity of about 80 wt. % or less.

Element 9: wherein the method further comprises separating a recycle stream from the product mixture, the recycle stream comprising at least one olefin oligomer; and reintroducing the recycle stream to the zeolite catalyst.

Exemplary combinations applicable to D may include, but are not limited to: 1 and 2; 1 and 3; 1 and 4; 1, 4 and 5; 1 and 4-6 1 and 6; 1, 4 and 6; 1, 4 and 7; 1 and 8; 1 and 9; 2 and 3; 2 and 4; 2, 4 and 5; 2 and 4-6; 2 and 6; 2, 4 and 6; 2, 4 and 7; 2 and 8; 2 and 9; 3 and 4; 3-5; 3-6; 3 and 6; 3, 4 and 6; 3, 4 and 7; 3 and 8; 3 and 9; 4 and 5; 4-6; 4 and 7; 4-7; 4 and 8; 4 and 9; 6 and 7; 6 and 8; 6 and 9; and 8 and 9.

Embodiment E may have one or more of the following additional elements in any combination:

Element 1: wherein at least a majority of the olefin oligomers are $C_{10}$-$C_{13}$ olefin oligomers, and at least $C_{12}$ olefin oligomers of the $C_{10}$-$C_{13}$ olefin oligomers have an average branching index ranging from about 1.3 to about 2.

Element 2: wherein the plurality of olefin oligomers comprises about 2 wt. % or less of $C_{10}$ olefin oligomers and about 2 wt. % or less of $C_{13}$ olefin oligomers.

Embodiment F may have one or more of the following additional elements in any combination:

Element 1: wherein the zeolite catalyst further comprises further comprising a binder selected from silica, alumina, and any combination thereof.

Element 2: wherein at least about 80% of the ZSM-23 crystallites have a crystallite size ranging from about 300 Å to about 800 Å.

The present disclosure is further directed to the following non-limiting clauses:

Clause 1. A method comprising:
contacting a feed mixture comprising at least one $C_3$ olefin and/or at least one $C_4$ olefin with a zeolite catalyst under oligomerization reaction conditions effective to form a product mixture comprising a plurality of olefin oligomers;
wherein an average branching index of $C_{12}$ olefin oligomers and a selectivity for $C_{10}$-$C_{13}$ olefin oligomers within the plurality of olefin oligomers are correlated to one another as a function of percentage of conversion of the at least one $C_3$ olefin and/or at the least one $C_4$ olefin;
specifying a targeted average branching index of $C_{12}$ olefin oligomers and/or a targeted selectivity for $C_{10}$-$C_{13}$ olefin oligomers; and
selecting at least one of a weight hour space velocity (WHSV) and a temperature sufficient to achieve a percentage of conversion of the at least one $C_3$ olefin and/or at the least one $C_4$ olefin to afford the targeted average branching index of $C_{12}$ olefin oligomers and/or the targeted selectivity for $C_{10}$-$C_{13}$ olefin oligomers.

Clause 2. The method of clause 1, wherein the selectivity for $C_{10}$-$C_{13}$ olefin oligomers is about 30% to about 55%, based on total olefin oligomers by mass, and/or the $C_{12}$ olefin oligomers have an average branching index, as measured by GC, ranging from about 1.3 to about 2.0.

Clause 3. The method of clause 1 or clause 2, wherein the zeolite catalyst has an MTT framework or a TON framework.

Clause 4. The method of any one of clauses 1-3, wherein the zeolite catalyst comprises ZSM-23 crystallites or ZSM-23 crystallites defining a shaped catalyst body.

Clause 5. The method of any one of clauses 1-4, wherein the zeolite catalyst is modified by steaming, modified with an organic acid, modified with a transition metal, modified with coke, or any combination thereof.

Clause 6. The method of clause 5, wherein the organic acid is oxalic acid and the transition metal is yttrium.

Clause 7. The method of any one of clauses 1-6, wherein the feed mixture consists essentially of at least one linear butene and a saturated hydrocarbon diluent, or the feed mixture consists essentially of at least one linear butene, isobutylene and a saturated hydrocarbon diluent.

Clause 8. The method of any one of clauses 1-7, further comprising:
separating a recycle stream from the product mixture, the recycle stream comprising at least one olefin oligomer; and
reintroducing the recycle stream to the zeolite catalyst.

Clause 9. The method of any one of clauses 1-8, wherein the zeolite catalyst has a Si:$Al_2$ molar ratio of about 30:1 to about 200:1 and comprises about 0.1 wt. % to about 3.3 wt. % framework Al—O, the zeolite catalyst further comprising about 0.1 wt. % to about 5 wt. % transition metal.

Clause 10. A composition comprising:
a plurality of olefin oligomers comprising at least $C_{12}$ olefin oligomers, the olefin oligomers
a) comprising one or more oligomers having about 8 to about 24 carbon atoms and at least about 70 wt. % Type II and Type IV olefins in total;
wherein an average number of methyl branches per carbon atom of the $C_{12}$ olefin oligomers ranges from about 0.08 to about 0.16; and/or
b) comprising at least about 10% $C_{12}$ olefin oligomers, based on total olefin oligomers by mass, and at least about 25% $C_{10}$-$C_{13}$ olefin oligomers, based on total olefin oligomers by mass, and at least the $C_{12}$ olefin oligomers having an average branching index as measured by GC of about 2.0 or less.

Clause 11. The composition of clause 10, wherein at least a majority of the olefin oligomers are $C_{10}$-$C_{13}$ olefin oligomers, and at least $C_{12}$ olefin oligomers of the $C_{10}$-$C_{13}$ olefin oligomers have an average branching index, as measured by GC, ranging from about 1.3 to about 2.0.

Clause 12. The composition of clause 10 or clause 11, wherein the plurality of olefin oligomers comprises about 5 wt. % or less of $C_{10}$ olefin oligomers and about 5 wt. % or less of $C_{13}$ olefin oligomers.

Clause 13. The composition of any one of clauses 10-12, wherein the plurality of olefin oligomers has about 8 to about 16 carbon atoms, and the plurality of olefin oligomers comprises about 2 wt. % or less $C_{10}$ olefin oligomers and about 2 wt. % or less $C_{13}$ olefin oligomers.

Clause 14. A composition comprising:
  a plurality of olefin oligomers comprising at least $C_{16}$ olefin oligomers, the olefin oligomers comprising at least about 70 wt. % Type II and Type IV olefins in total and an average number of methyl branches per carbon atom of the $C_{16}$ olefin oligomers ranges from about 0.08 to about 0.16.

Clause 15. A zeolite catalyst comprising:
  ZSM-23 crystallites having a Si:$Al_2$ molar ratio above about 30 and an average crystallite size of about 0.1 microns or less;
    wherein the ZSM-23 crystallites or ZSM-23 crystallites defining a shaped catalyst body are modified by steaming, modified with an organic acid, modified with a transition metal, modified with coke, modified by NiO impregnation, or any combination thereof.

Clause 16. The zeolite catalyst of clause 15, wherein the ZSM-23 crystallites have a Si:$Al_2$ molar ratio of about 30:1 to about 200:1 and comprise about 0.1 wt. % to about 3.3 wt. % framework Al—O, the ZSM-23 crystallites further comprising about 0.1 wt. % to about 5 wt. % transition metal.

Clause 17. The zeolite catalyst of clause 15 or clause 16, further comprising a binder selected from the group consisting of silica, alumina, a metal oxide, titania, zirconia, silica-alumina, and any combination thereof.

Clause 18. The zeolite catalyst of any one of clauses 15-17, wherein at least about 80% of the ZSM-23 crystallites have a crystallite size ranging from about 300 Å to about 800 Å.

To facilitate a better understanding of the embodiments of the present disclosure, the following examples of preferred or representative embodiments are given. In no way should the following examples be read to limit, or to define, the scope of the invention.

EXAMPLES

Example 1: General Procedure for Oligomerization and Zeolite Catalyst Screening

A feed mixture maintained at 50% olefinicity by mass was provided to a fixed bed reactor having an internal diameter of 7 mm containing 2-3 g of catalyst particles having a size of 2-3 mm that was further diluted with SiC. Prior to exposing the catalyst to the feed mixture, the catalyst was dried at 150° C. for 5 hours under $N_2$. The feed mixture was provided to the catalyst bed in downflow mode at 190° C. and 70 bar pressure using Bronkhorst mass flow controllers to regulate delivery. The reactor effluent was analyzed by online gas chromatography (GC), after hydrogenation of the products using Pt/$Al_2O_3$ hydrogenation catalyst.

Figure 3:
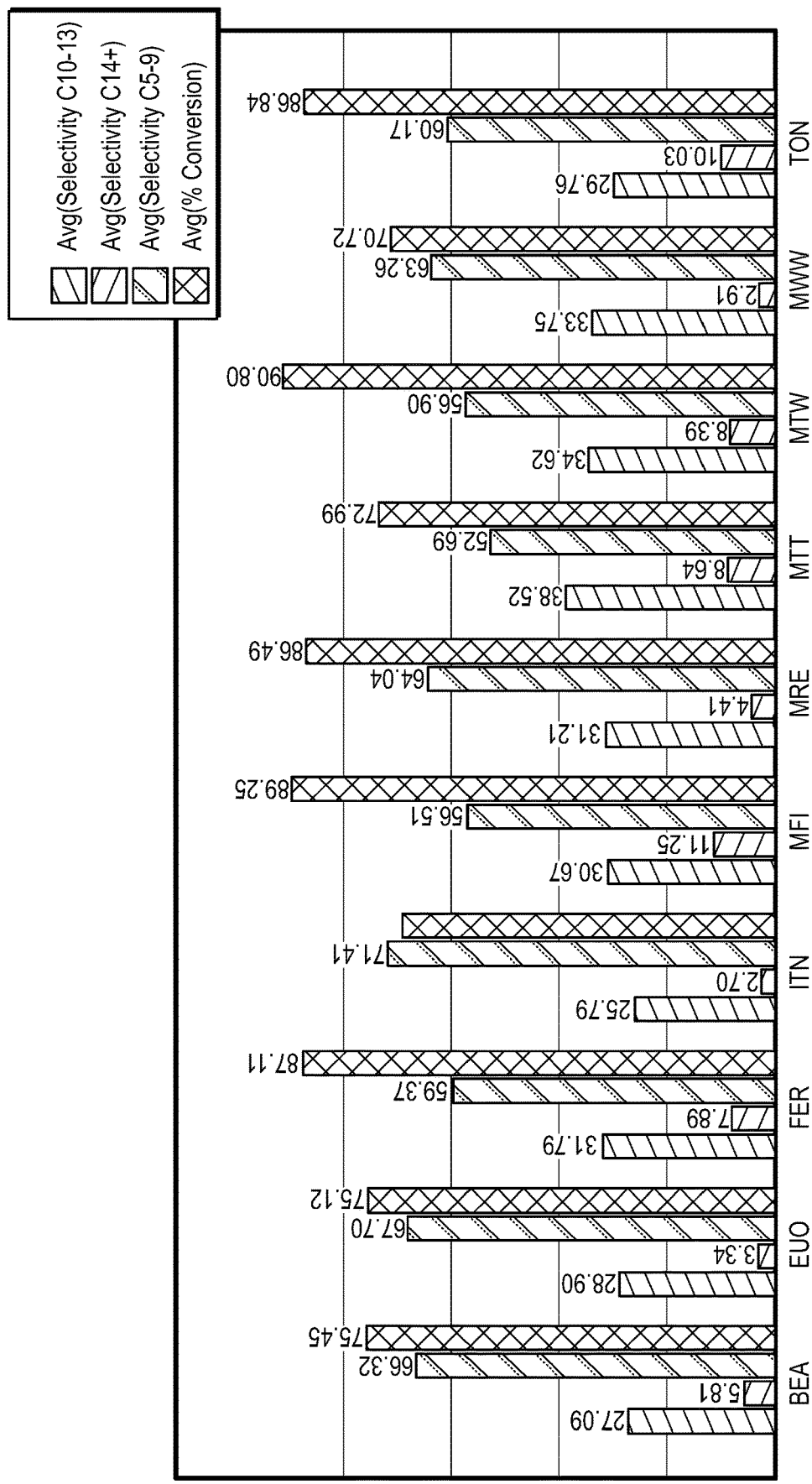
FIG. 3 is a bar graph of product distribution obtained when oligomerizing a feed mixture comprising 50:40:10 1-butene/butane/isobutane using various zeolite catalysts.
Figure 4:
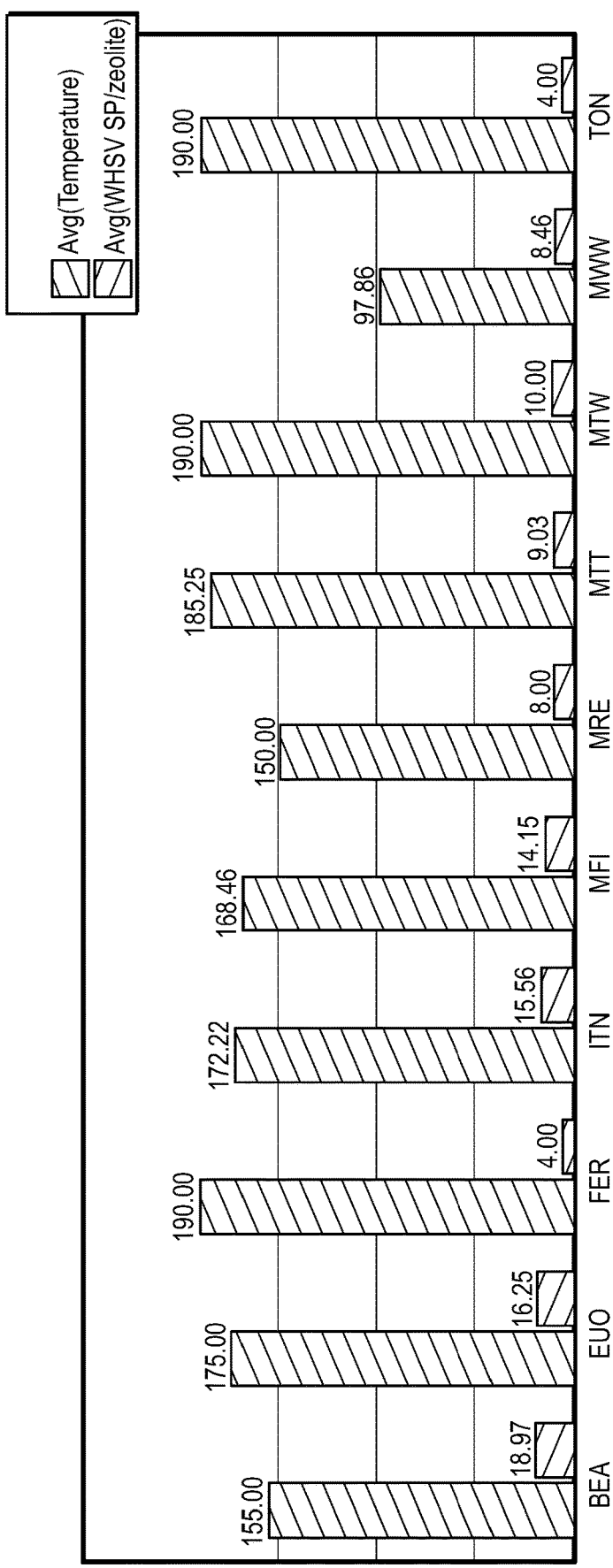
FIG. 4 is a bar graph summarizing the temperature and WHSV values ($hr^{-1}$) used for obtaining the conversion data in FIG. 3.

Various zeolite catalysts having a range of framework structures were screened under the above conditions. The zeolite catalysts were obtained from commercial sources or synthesized using known procedures. FIG. 3 is a bar graph of product distribution obtained when oligomerizing a feed mixture comprising 50:40:10 1-butene/butane/isobutane using various zeolite catalysts. The isobutane was employed as an internal standard. Of the framework structures studied, only those having an MTT framework of a TON framework afforded $C_{12}$ products having an average branching index below 2.2 (1.0-2.2). All other framework structures depicted in FIG. 3 afforded average branching index values for $C_{12}$ products ranging from 2.2-3. Analyses for measuring average branching index are provided further below. As shown, the zeolite catalysts having an MTT framework afforded the highest selectivity for $C_{10}$-$C_{13}$ products, whereas zeolite catalysts having a TON framework afforded a considerably lower selectivity for $C_{10}$-$C_{13}$ products. Among the zeolite frameworks tested, the MTT framework also provided the lowest selectivity for formation of $C_5$-$C_9$ products, while also maintaining a low selectivity for formation of $C_{14+}$ oligomeric products. Overall, the TON framework provided the highest conversion values. FIG. 4 is a bar graph summarizing the temperature and WHSV values ($hr^{-1}$) used for obtaining the conversion data in FIG. 3. As shown, the zeolite catalyst having an MTT framework was operable at over double the WHSV of the zeolite catalyst having a TON framework. Hence, further optimization efforts largely centered around this zeolite framework. In FIG. 3, 1-butene conversion was calculated by Formula 1 below, wherein $M_{reactants,I}$ is the area percentage by GC of 1-butene and 2-butene at a time on stream (TOS) of I, $M_{reactants,0}$ is the area percentage by GC of 1-butene at a TOS of 0, $M_{is,i}$ is the area percentage by GC of an internal standard at a TOS of Ii, and $M_{is,0}$ is the area percentage by GC of an internal standard at a TOS of 0.

$$\text{Conversion} = 100[1-(M_{reactants,I} \cdot M_{is,0})/M_{reactants,0} \cdot M_{is,i})] \quad \text{Formula 1}$$

Average branching index (BI) of $C_8$ olefin oligomer and $C_{12}$ olefin oligomers were measured by Formulas 2 and 3 below, respectively.

$$BI\ (C_8) = (1 \cdot M_{monobranched\ C8} + 2 \cdot M_{dibranched\ C8} + 3 \cdot M_{tribranched\ C8})/M_{total,\ C8} \quad \text{Formula 2}$$

$$BI\ (C_{12}) = (1 \cdot M_{monobranched\ C12} + 2.5 \cdot M_{multibranched\ C12})/M_{total,C12} \quad \text{Formula 3}$$

In Formulas 2 and 3, each M represents the area by GC of each species.

Example 2: ZSM-23 Catalyst Preparations

ZSM-23 was prepared as an example zeolite catalyst having an MTT framework. Preparation of ZSM-23 and various further modifications thereto are provided below.

Catalyst A (Unmodified):

Unmodified ZSM-23 catalyst was prepared as described in U.S. Pat. Nos. 4,076,842, 5,332,566 and 8,500,991, each of which is incorporated herein by reference in its entirety. The XRD pattern of the as-synthesized material showed a characteristic ZSM-23 topology. The SEM of the as-synthesized material showed that the material comprised agglomerates of small crystals having a size of <0.05 micron and LD<3. After ion-exchange, drying, and calcination, the resulting ZSM-23 crystals had a $SiO_2$/$Al_2O_3$ molar ratio of ~40/1. The primary crystal size was <0.1 micron, and the surface area was >50 $m^2$/g.

Catalyst B (Steam Modified):

Steam-modified ZSM-23 was prepared by exposing unmodified ZSM-23 crystals or catalyst extrudates to steam at 500-700° F. (260-371° C.) for 2-12 hours.

Catalyst C (Oxalic Acid Modified):

Oxalic acid-modified ZSM-23 was prepared by combining unmodified ZSM-23 crystals with aqueous oxalic acid and stirring at 60-80° C. for 2-12 hours. An aqueous oxalic acid solution having a concentration of 1.5 M was used for treating approximately 50 g of extrudates. Following exposure to the oxalic acid solution, the catalyst was washed with deionized water, dried at 120° C., and calcined at 400° C. in air for 2 hours.

Catalyst D (Y Modified):

Yttrium-modified ZSM-23 was prepared by combining unmodified ZSM-23 crystals with yttrium nitrate hexahydrate solution and impregnating by incipient wetness to afford a Y:Al mole ratio of 0.4-0.8, as described in U.S. Pat. No. 7,759,533, which is incorporated herein by reference in its entirety. After impregnation, drying and calcination was performed 538° C. for 3 hours.

Catalyst E (Steam Modified and Oxalic Acid Modified):

Steam-modified ZSM-23 was prepared as above for Catalyst B and then oxalic acid modification was conducted as above for Catalyst C.

Catalyst F (Steam Modified and Y Modified):

Y-modified ZSM-23 was prepared as above for Catalyst E, and then steam modification was conducted as above for Catalyst B.

Catalyst extrudates were obtained by combining the as-synthesized zeolite crystals with alumina. In brief, 65 parts of the as-synthesized zeolite crystals were mixed with 35 parts VERSAL-300 alumina in a muller. The mixture was extruded into 1/16" cylindrical extrudates or 1/20" quadralobe extrudates and then dried at 121° C. overnight. The dried extrudates were calcined in nitrogen at 538° C. for 3 hours. The extrudates were humidified with saturated air, exchanged with 1 M ammonium nitrate, and washed with deionized water. The extrudates were then dried at 121° C. overnight and calcined in air at 538° C. for 3 hours. Silica-bound catalyst extrudates were prepared similarly by substituting silica for alumina.

Zeolite catalysts having different frameworks were synthesized using appropriate methods and modified under conditions similar to those discussed above.

Example 3: $C_{12}$ Product Distribution from $C_3/C_4$ Olefin Feed

Product distributions were determined as described in Chromatographia, 1, 1968, pp. 316-326. In brief, the carbon number distribution and branching index can be measured using a HP-5890 GC equipped by a 30 meter DB-1 column (0.1 mm i.d.×0.2 μm film thickness) equipped with a $H_2$ gas line and $Pt/Al_2O_3$ catalyst for hydrogenation of olefins prior to the GC analysis.

Table 1 below shows the product distribution of $C_{12}$ olefins obtained as above, as determined by GC, under three different sets of oligomerization reaction conditions.

TABLE 1

| Sample | Linear $C_{12}$ (Wt. %) | Monobranched $C_{12}$ (Wt. %) | Dibranched $C_{12}$ (Wt. %) | Tribranched $C_{12}$ (Wt. %) | Branching Index by GC |
|---|---|---|---|---|---|
| A | 5 | 57 | 35 | 3 | 1.36 |
| B | 6 | 53 | 33 | 8 | 1.52 |
| C | 4 | 32 | 49 | 14 | 1.81 |

Table 2A below shows the product distribution of $C_{12}$ olefin oligomers obtained as above, as determined by NMR.

TABLE 2A

| | Sample A | Sample B | Sample C |
|---|---|---|---|
| Olefin Type | | | |
| Type I | 1.39 | 1.56 | 1.82 |
| Type II | 35.88 | 35.11 | 35.14 |
| Type III | 3.64 | 3.68 | 3.73 |
| Type IV A | 49.37 | 48.19 | 45.42 |
| Type IV B | 1.34 | 2.24 | 4.58 |
| Type V | 8.37 | 9.22 | 9.32 |
| TOTAL | 99.99 | 100 | 100.01 |
| Carbon Type | | | |
| $CH_3$ | 2.45 | 2.51 | 2.79 |
| $CH_2$ | 4.53 | 4.44 | 4.02 |
| CH | 0.32 | 0.35 | 0.47 |
| C | 0.05 | 0.05 | 0.07 |
| $CH_3$ on olefin | 0.84 | 0.86 | 0.83 |
| $CH_2$ on olefin | 1.63 | 1.57 | 1.48 |
| CH on olefin | 0.17 | 0.20 | 0.30 |
| C on olefin | 0.02 | 0.02 | 0.02 |
| $CH_2$= | 0.05 | 0.05 | 0.05 |
| CH= | 1.23 | 1.21 | 1.21 |
| C= | 0.71 | 0.72 | 0.71 |
| TOTAL | 12 | 11.98 | 11.95 |
| Branching Index by NMR | 1.3 | 1.4 | 1.7 |
| Number of Methyl Branches Per Carbon Atom | 0.11 | 0.12 | 0.14 |

The number of methyl branches per carbon atom was determined by the expression ($CH_3$+$CH_3$ on olefin+$CH_2$=−2)/total carbons. The subtracted "2" represents the two terminal methyl groups or methyl group equivalent in an acyclic hydrocarbon.

Example 4: $C_{16}$ Branching Index from $C_3/C_4$ Olefin Feed

The branching indices of $C_{16}$ olefin oligomers were similar to those of $C_{12}$ olefin oligomers obtained under similar oligomerization reaction conditions. Table 2B below shows the product distribution of $C_{16}$ olefin oligomers, as determined by NMR In this case, the $C_{16}$ olefin oligomers (Sample D) were obtained under the conditions of Example 12 (see below, aggregate of entire run). The corresponding branching index by GC is also given in Table 2B.

TABLE 2B

| | Sample D |
|---|---|
| Olefin Type | |
| Type I | 1.76 |
| Type II | 30.27 |
| Type III | 3.93 |

TABLE 2B-continued

| | Sample D |
|---|---|
| Type IV A | 47.97 |
| Type IV B | 1.38 |
| Type V | 14.69 |
| TOTAL Carbon Type | 100.0 |
| $CH_3$ | 3.08 |
| $CH_2$ | 6.90 |
| CH | 0.22 |
| C | 0.20 |
| $CH_3$ on olefin | 0.79 |
| $CH_2$ on olefin | 1.61 |
| CH on olefin | 0.23 |
| C on olefin | 0.14 |
| $CH_2$= | 0.06 |
| CH= | 1.12 |
| C= | 0.83 |
| TOTAL | 15.16 |
| Branching Index by NMR | 1.93 |
| Branching Index by GC | 1.8 |
| Number of Methyl Groups Per Carbon Atom | 0.13 |

Figure 5:
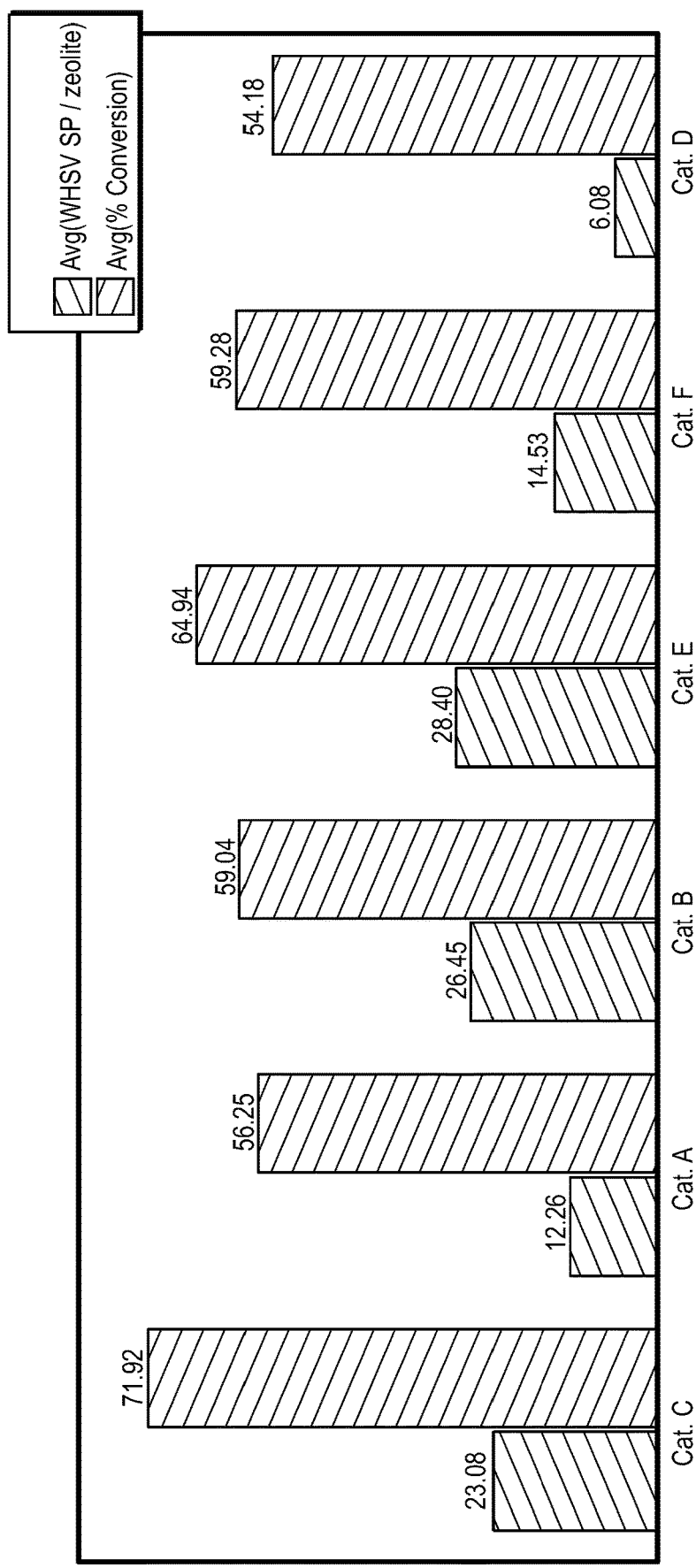
FIG. 5 is a bar graph showing 1-butene conversion for variously treated ZSM-23 catalysts.

Example 5: $C_8$-$C_{12}$ Product Distribution with Variously Treated ZSM-23 Catalysts A feed mixture containing 1-butene, butane, and isobutane was provided in a 50:40:10 ratio on a mass basis. The isobutane was used as an internal standard. Oligomerization of the feed mixture was performed as in Example 1. Results from the variously prepared catalysts are shown in FIG. 5 below, which is a bar graph showing 1-butene conversion for variously treated ZSM-23 catalysts. As shown, the unmodified ZSM-23 (Catalyst A) and Y modified ZSM-23 (Catalyst D) afforded the lowest conversion values, even at low WHSV values. Combined steaming and yttrium modification (Catalyst F) afforded improved feed mixture conversion, albeit at still relatively low WHSV values. Oxalic acid modification (Catalyst C), steam modification (Catalyst B) and combined steaming and oxalic acid modification (Catalyst E) afforded considerably improved feed mixture conversion, even at much higher WHSV values compared to the other catalysts. Oxalic acid modification afforded the highest conversion values, but steaming and steaming/oxalic acid modification afforded only marginally lower conversion values at somewhat higher WHSV values. From a process standpoint, operability at higher WHSV values at a somewhat lower conversion rate may be preferable to higher conversion values at a lower WHSV.

Figure 6:
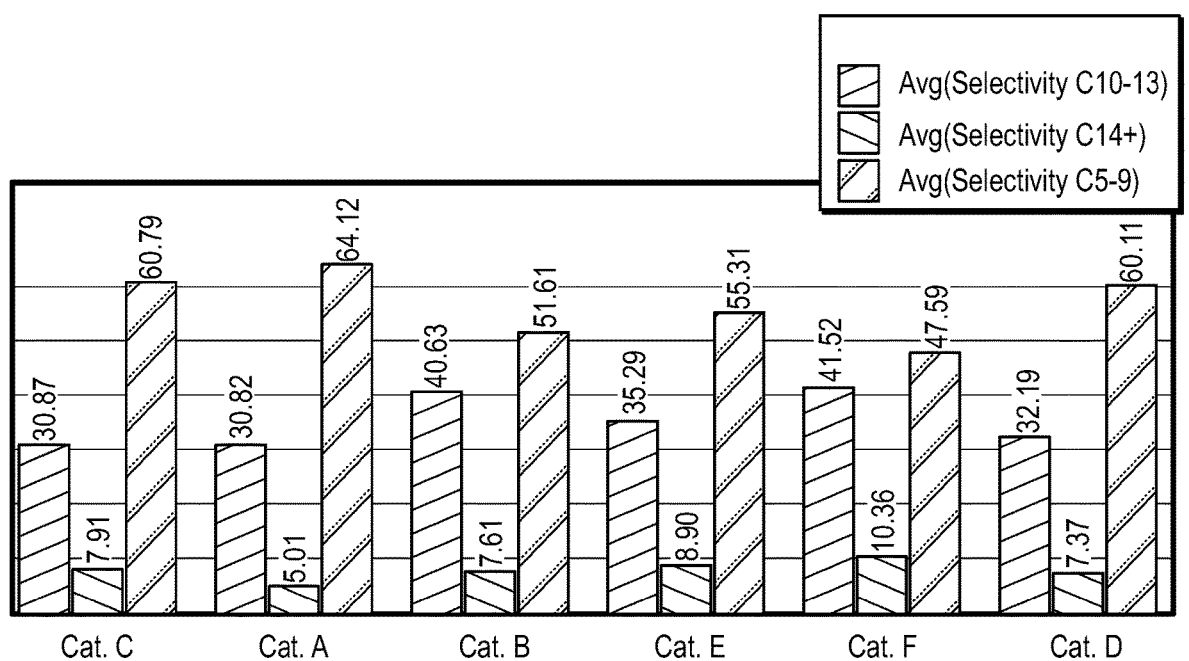
FIG. 6 is a bar graph showing product selectivity for 1-butene conversion using variously treated ZSM-23 catalysts.

FIG. 6 is a bar graph showing product selectivity for 1-butene conversion using variously treated ZSM-23 catalysts. As shown, steam modification (Catalyst B), combined steaming and oxalic acid modification (Catalyst E), and combined steaming and yttrium modification (Catalyst F) afforded comparable formation of $C_{10}$-$C_{13}$ products, each instance being superior to unmodified ZSM-23 (Catalyst A) and oxalic acid modification (Catalyst C) in terms of $C_{10}$-$C_{13}$ selectivity. A 5-10% increase in $C_{10}$-$C_{13}$ selectivity was realized for these catalysts. Catalyst B, Catalyst E and Catalyst F maintained formation of relatively small levels of higher oligomer $C_{14+}$ products and afforded decreased levels of lower $C_5$-$C_9$ oligomers, as compared to Catalyst A and Catalyst C. Thus, there is overlap between catalysts that facilitate operation at high WHSV values and those that afford high $C_{10}$-$C_{13}$ selectivity (Catalyst B and Catalyst E).

Figure 7:
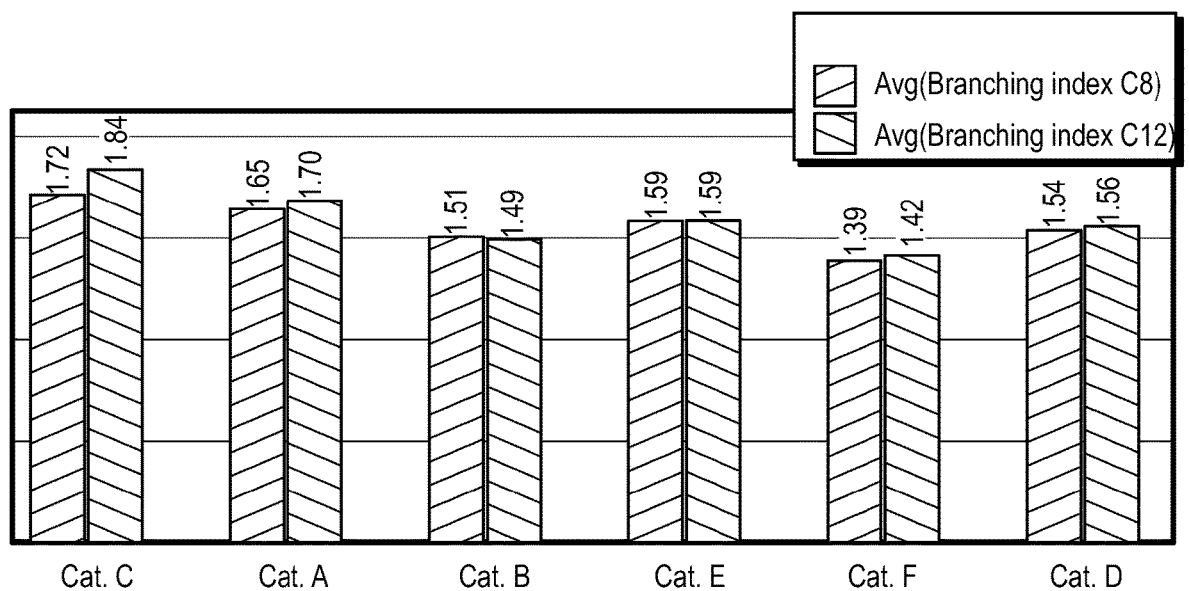
FIG. 7 is a bar graph showing average branching index for $C_8$ olefin oligomers and $C_{12}$ olefin oligomers obtained from 1-butene conversion using variously treated ZSM-23 catalysts.

FIG. 7 is a bar graph showing average branching index for $C_8$ olefin oligomers and $C_{12}$ olefin oligomers obtained from 1-butene conversion using variously treated ZSM-23 catalysts. As shown, steam modification (Catalyst B), yttrium modification (Catalyst D), combined steaming and oxalic acid modification (Catalyst E), and combined steaming and yttrium modification (Catalyst F) afforded decreased branching index values compared to unmodified ZSM-23 (Catalyst A) and oxalic acid medication (Catalyst C). Thus, there is overlap between catalysts that facilitate operation at high WHSV values, those that afford high $C_{10}$-$C_{13}$ selectivity, and those that afford low branching index values (Catalyst B and Catalyst E). Catalyst F offers affords surprisingly low branching index values, albeit at relatively low WHSV values.

As shown in FIGS. 5-7, various ZSM-23 modification conditions may afford considerable flexibility for tuning product characteristics depending on application-specific needs. For example, Catalyst B and Catalyst E offer a combination of the ability to operate at high WHSV values, while still affording good $C_{10}$-$C_{13}$ selectivity and low average branching index values. If a higher average branching index is needed, Catalyst C may be chosen, since it too facilitates operation at high WHSV values. In contrast, if an especially low average branching index is needed, Catalyst F may be selected, provided that operation at low WHSV values is tolerable. Additional techniques for altering the product characteristics are provided in the further examples below.

Figure 8:
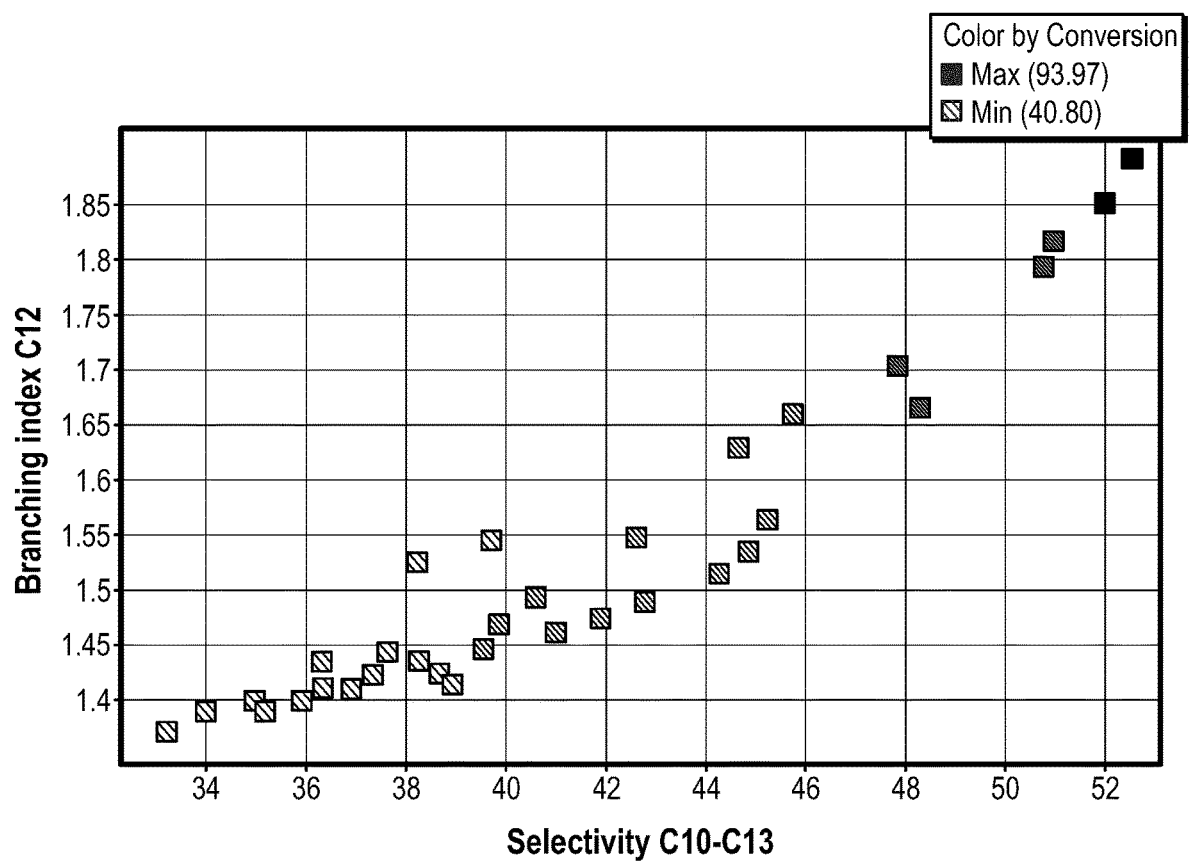
FIG. 8 is a graph of average branching index versus $C_{10}$-$C_{13}$ selectivity for 1-butene conversion using Catalyst B over a range of WHSV values.

FIG. 8 is a graph of average branching index versus $C_{10}$-$C_{13}$ selectivity for 1-butene conversion using Catalyst B over a range of WHSV values. As shown, there was a steady, near-linear increase in average branching index of the $C_{12}$ component of the product mixture as a function of the $C_{10}$-$C_{13}$ product selectivity. The $C_{10}$-$C_{13}$ product selectivity, in turn, was dependent upon the percentage of 1-butene conversion, which is proportional to the WHSV. Thus, depending on the branching content desired in the oligomerized product, the reaction may take place at either high conversion/high $C_{10}$-$C_{13}$ selectivity values, which afford a relatively high branching index for $C_{12}$ products, or at low conversion/low $C_{10}$-$C_{13}$ selectivity values, which afford a relatively low branching index for $C_{12}$ products. Unconverted olefin feed mixture may be recycled to increase overall conversion, particularly for relatively low conversion values.

Example 6: Product Distribution with Steamed ZSM-23 Catalyst and 1-butene/Butane Feed Mixture A feed mixture comprising 1-butene and butane, maintained at 50 wt. % olefinicity, was provided to a fixed bed reactor in a similar manner to Example 1, except 8-15 g of steamed ZSM-23 catalyst particles (2-3 mm) (Catalyst B) diluted with an equivalent mass of SiC was loaded in the reactor. Steaming was conducted at 600° F. (316° C.) for 6 hours, and the zeolite catalyst was in the form of 1/16" extrudates containing 65% zeolite and 35% binder ($Al_2O_3$ or $SiO_2$). Prior to exposing the catalyst to the feed mixture, the catalyst was dried at 150° C. for 5 hours under $N_2$. The feed mixture was provided to the catalyst bed in downflow mode at 190-214° C. and 70 bar pressure at WHSV values ranging from 16-27 $hr^{-1}$. The reactor effluent was analyzed by online gas chromatography (after hydrogenation of the products using $Pt/Al_2O_3$ hydrogenation catalyst).

Figure 9:
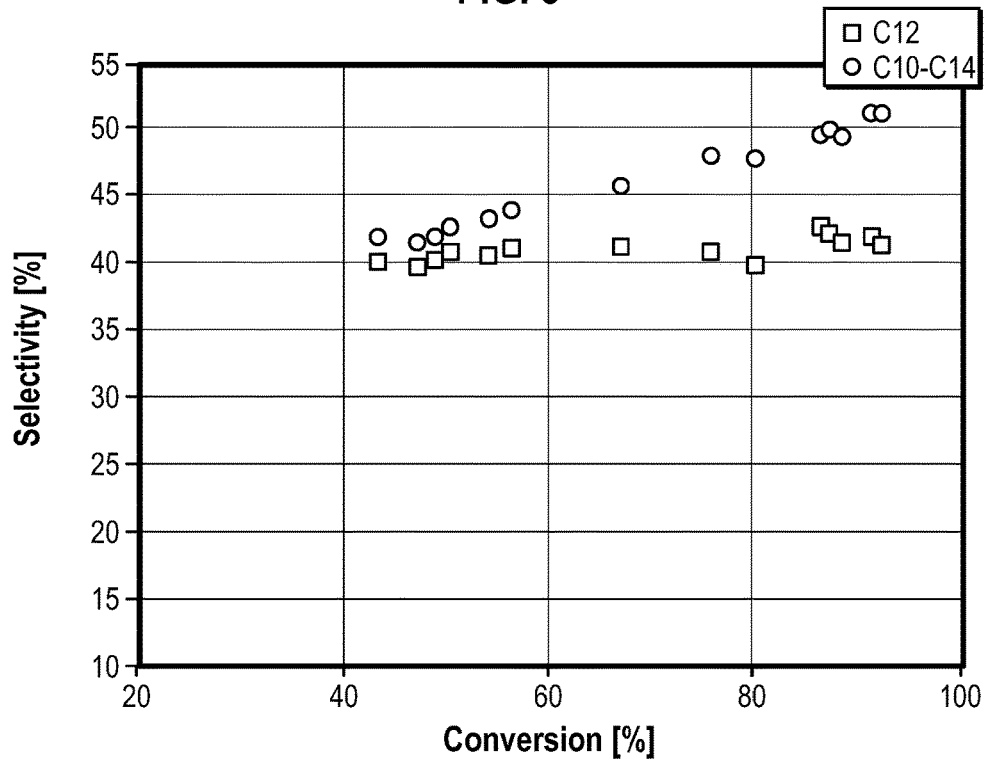
FIG. 9 is a graph of $C_{12}$ product selectivity and $C_{10}$-$C_{14}$ product selectivity as a function of 1-butene/butane feed mixture conversion using Catalyst B over a range of WHSV values.
Figure 10:
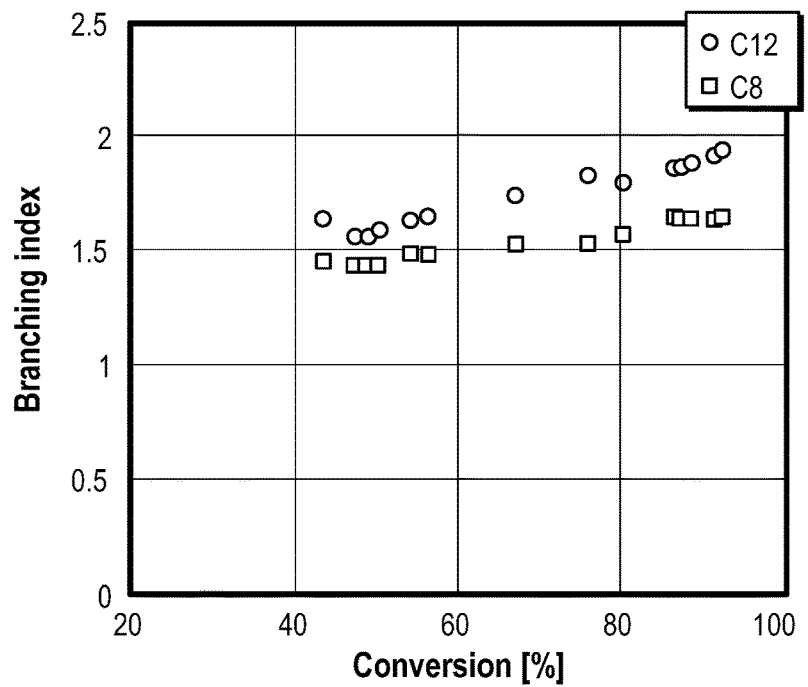
FIG. 10 is a graph of average branching index for $C_8$ olefin oligomers and $C_{12}$ olefin oligomers as a function of 1-butene/butane feed mixture conversion using Catalyst B over a range of WHSV values.

FIG. 9 is a graph of $C_{12}$ product selectivity and $C_{10}$-$C_{14}$ product selectivity as a function of 1-butene/butane feed mixture conversion using Catalyst B over a range of WHSV values. Surprisingly, the selectivity toward $C_{12}$ product formation remained relatively steady over the range of WHSV values tested, whereas at higher conversion, the selectivity toward $C_{10}$-$C_{14}$ olefin oligomers increased. Thus, at higher conversion, the fraction of $C_{12}$ olefin oligomers in the $C_{10}$-$C_{14}$ product range decreased. Again, depending on whether or not a high fraction of $C_{12}$ olefin oligomers is needed in a particular product blend, as well as the desired extent of branching thereon (Example 5), one may operate under low- or high-conversion conditions, with the feed mixture being recycled, if desired, to increase conversion. FIG. 10 is a graph of average branching index for $C_8$ olefin oligomers and $C_{12}$ olefin oligomers as a function of 1-butene/butane feed mixture conversion using Catalyst B over a range of WHSV values. At low-conversion conditions, the average branching index for $C_{12}$ olefin oligomers was approximately 1.5-1.6 and approached a value of approximately 2 under high-conversion conditions. The average branching index for $C_8$ olefin oligomers remained between approximately 1.5-1.6 over the entire range of tested conditions.

Figure 11:
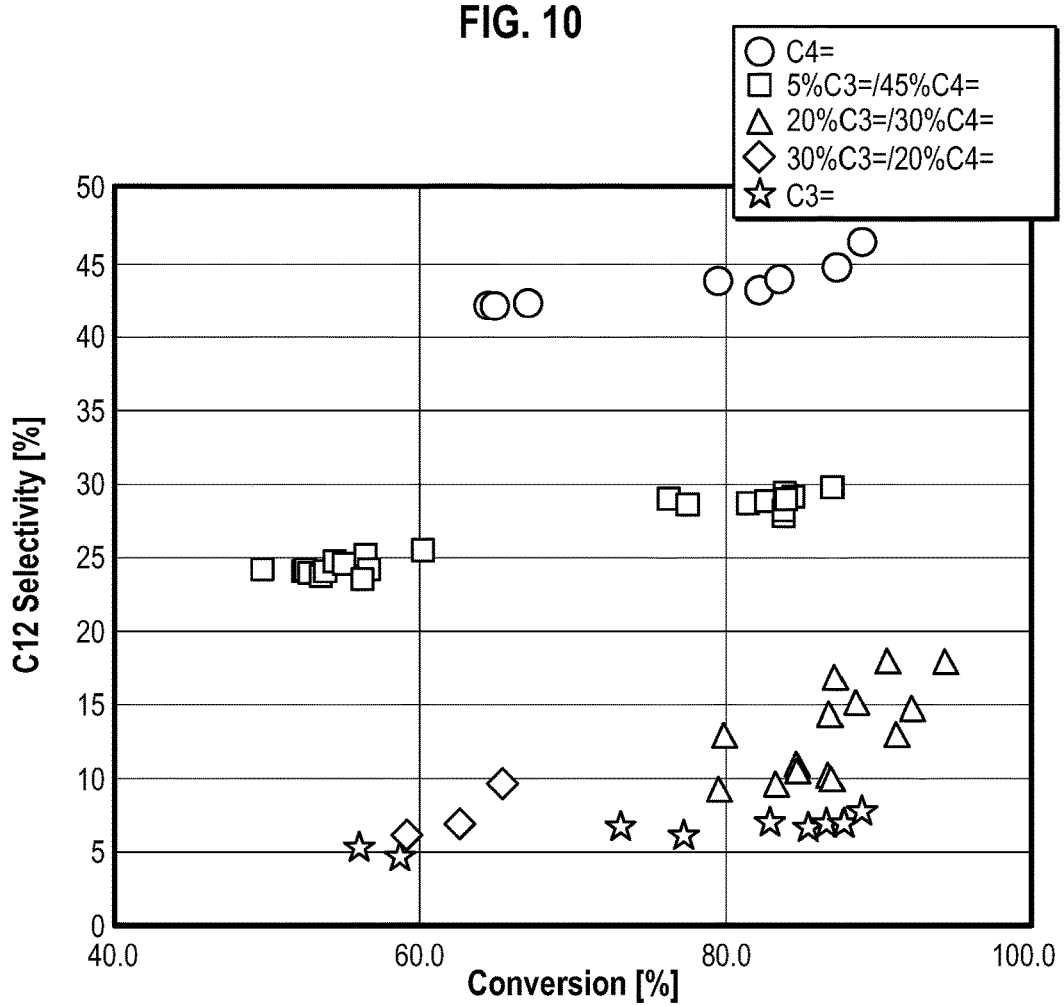
FIG. 11 is a graph of $C_{12}$ product selectivity as a function of 1-butene/propylene feed mixture conversion using Catalyst B over a range of WHSV values and differing ratios of 1-butene to propylene.
Figure 12:
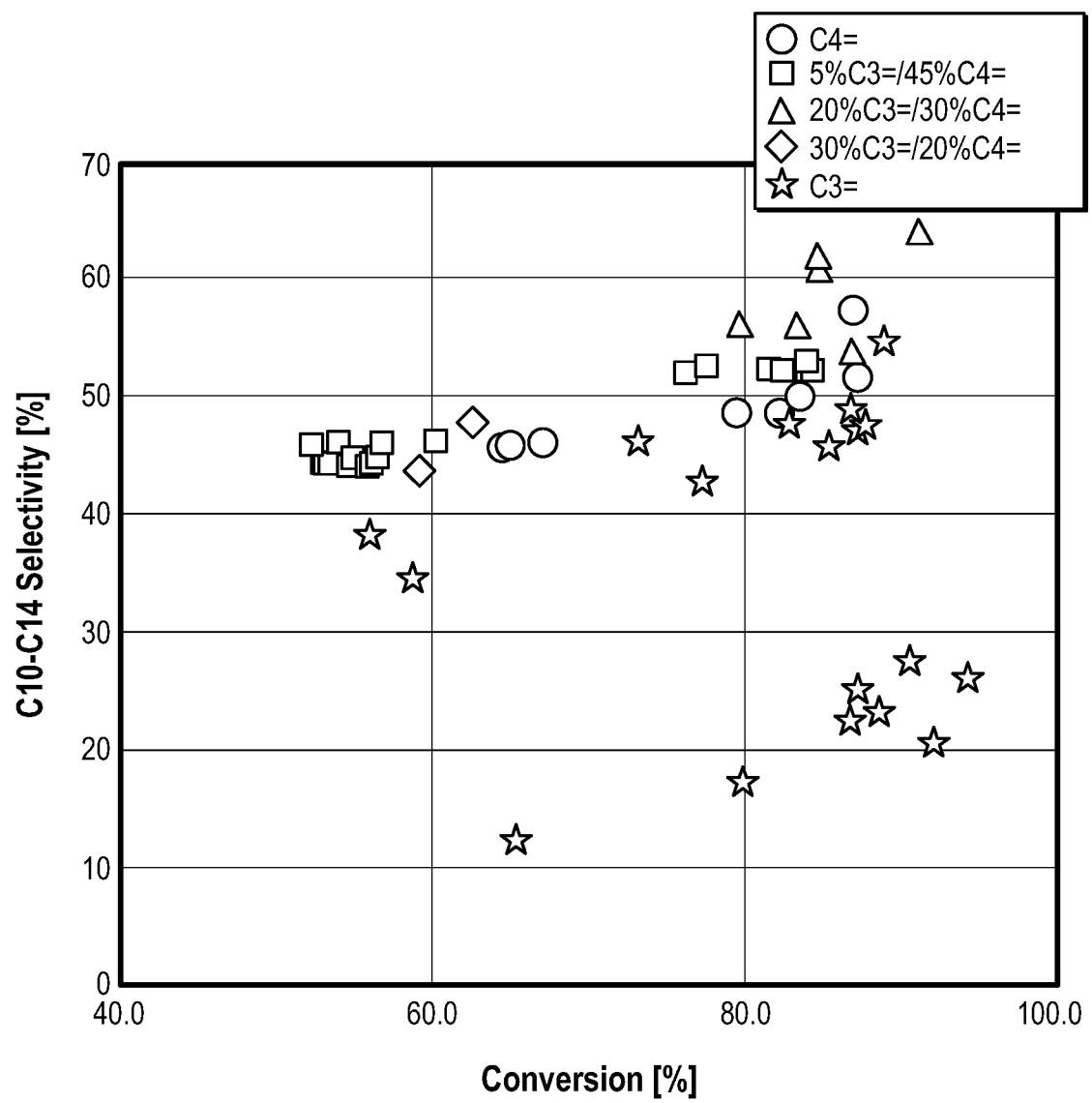
FIG. 12 is a graph of $C_{10}$-$C_{14}$ product selectivity as a function of 1-butene/propylene feed mixture conversion using Catalyst B over a range of WHSV values and differing ratios of 1-butene to propylene.

Example 7: Product Distribution with Steamed ZSM-23 Catalyst and 1-butene/Propylene Feed Mixture Example 6 was repeated with 1-butene/propylene in various ratios being used as the feed mixture. The overall olefinicity of the feed mixture was again maintained at 50 wt. % with a saturated hydrocarbon diluent. The saturated hydrocarbon diluent was butane in all instances, except for a propylene-only feed, in which case the saturated hydrocarbon diluent was propane. FIG. 11 is a graph of $C_{12}$ product selectivity as a function of 1-butene/propylene feed mixture conversion using Catalyst B over a range of WHSV values and differing ratios of 1-butene to propylene. As shown, the $C_{12}$ product selectivity remained fairly steady for a given 1-butene/propylene feed mixture composition, increasing slightly at higher conversion values. The highest $C_{12}$ product selectivity was obtained when propylene was omitted from the feed mixture. Even when a minor amount of propylene (5 wt. %) was combined with 1-butene, the $C_{12}$ product selectivity dropped by nearly half. Surprisingly, feed mixtures containing higher ratios of propylene in 1-butene/propylene mixtures afforded even poorer $C_{12}$ product selectivity than did propylene alone. FIG. 12 is a graph of $C_{10}$-$C_{14}$ product selectivity as a function of 1-butene/propylene feed mixture conversion using Catalyst B over a range of WHSV values and differing ratios of 1-butene to propylene. Further surprisingly, except for a propylene-only feed, the $C_{10}$-$C_{14}$ product selectivity, other than trending toward increased selectivity values at higher conversion, was largely independent of the 1-butene/propylene ratio in the feed mixture. The average branching index values (data not shown) again trended lower at low conversion percentages and higher at high conversion percentages, and remained essentially independent of the feed mixture composition.

Figure 13:
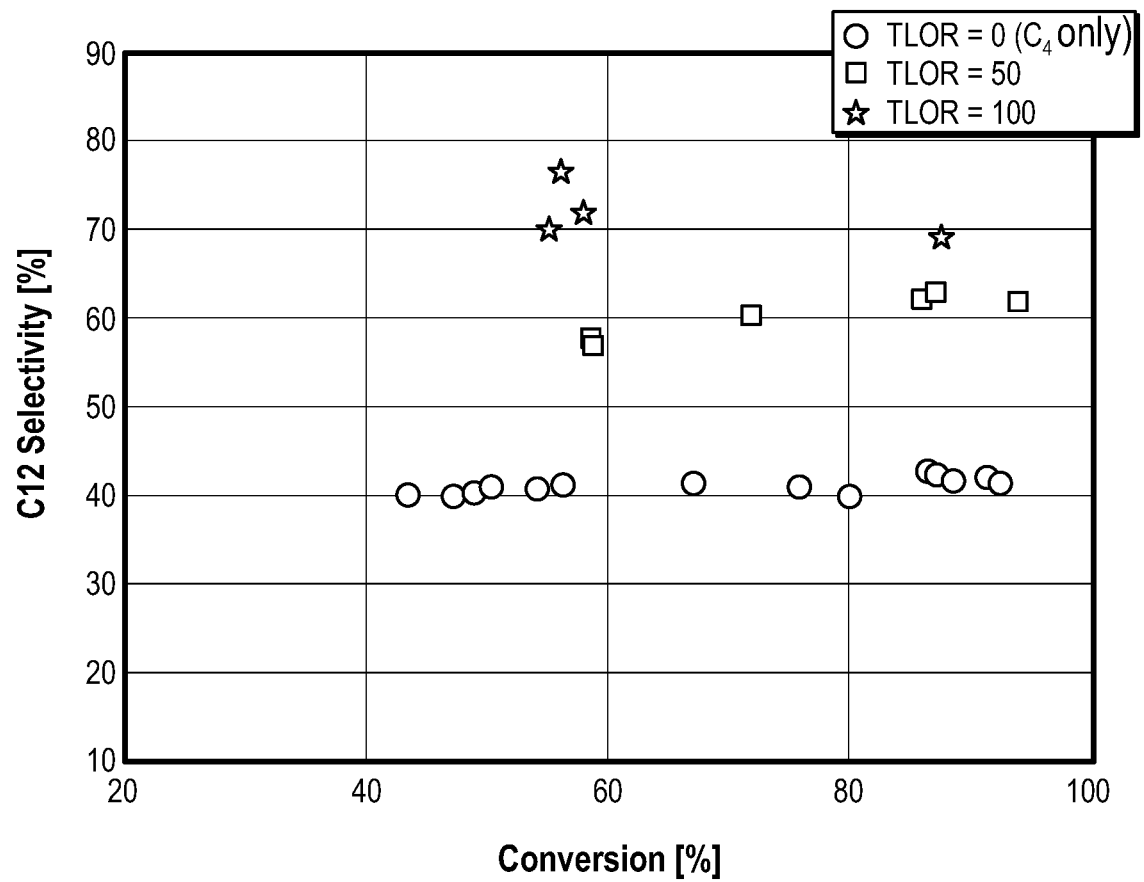
FIG. 13 is a graph of $C_{12}$ product selectivity as a function of 1-butene/$C_8$ olefins feed mixture conversion using Catalyst B over a range of WHSV values and at various ratios of 1-butene to $C_8$ olefins.

Example 8: $C_{12}$ Product Selectivity with Steamed ZSM-23 Catalyst and 1-butene/$C_8$ Olefin Feed Mixture Example 6 was repeated with 1-butene/$C_8$ olefins in various ratios as the feed mixture. The $C_8$ olefins were those obtained in Example 6. The overall olefinicity of the feed mixture was again maintained at 50 wt. % with a saturated hydrocarbon diluent. The saturated hydrocarbon diluent was butane in all instances. The combination of $C_8$ olefins with a 1-butene feed simulates recycling of $C_8$ olefins under production conditions. The $C_8$ olefins content in the feed mixture was established based upon total liquid olefin recycle (TLOR) anticipated to occur under $C_8$ olefin recycling. TLOR is defined as the amount of $C_8$ olefins in the feed in wt. % divided by the $C_4$ feed amount in wt. %. FIG. 13 is a graph of $C_{12}$ product selectivity as a function of 1-butene/$C_8$ olefins feed mixture conversion using Catalyst B over a range of WHSV values and at various ratios of 1-butene to $C_8$ olefins. As shown, introducing a simulated dimer recycle into the 1-butene feed significantly increased the reaction selectivity toward formation of $C_{12}$ olefin oligomers (trimers). As with other feeds, the $C_{12}$ product selectivity remained largely independent of the extent of conversion. Feed mixtures containing a higher content of $C_8$ olefins (higher TLOR value) afforded significantly improved selectivity toward formation of $C_{12}$ olefin oligomers. Under production conditions, an upper amount of $C_{12}$ product formation may be limited by the amount of $C_8$ olefins available for recycling. The average branching index values (data not shown) again trended lower at low conversion percentages and higher at high conversion percentages, and remained essentially independent of the feed mixture composition.

Figure 14A:
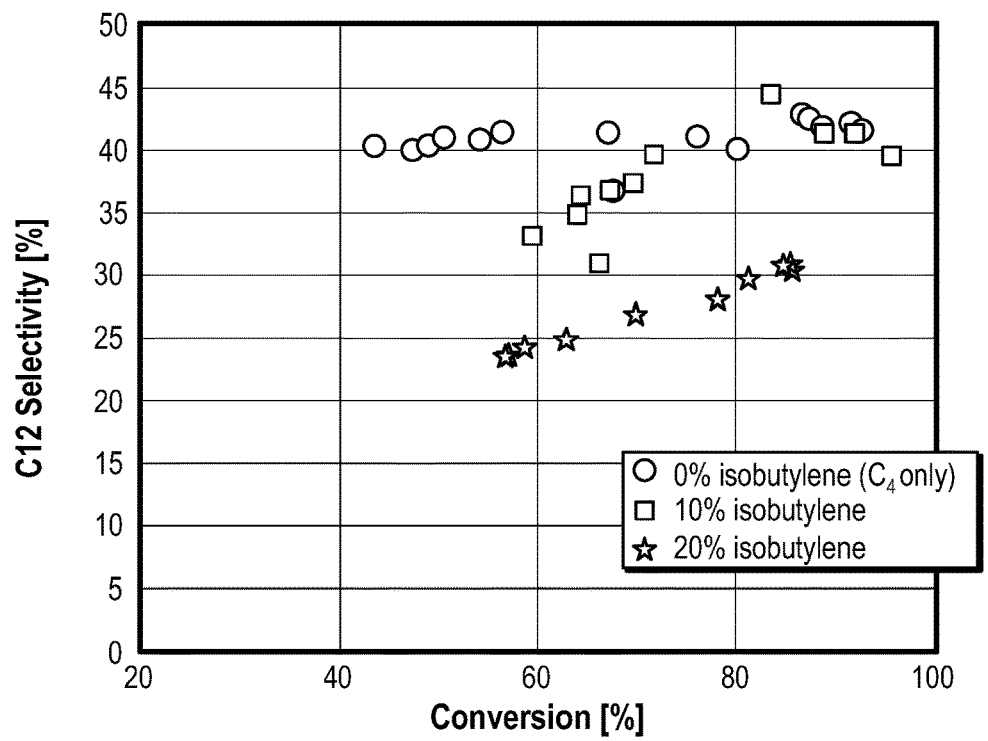
FIG. 14A is a graph of $C_{12}$ product selectivity as a function of 1-butene/isobutylene feed mixture conversion using Catalyst B over a range of WHSV values and at various ratios of 1-butene to isobutylene.
Figure 14B:
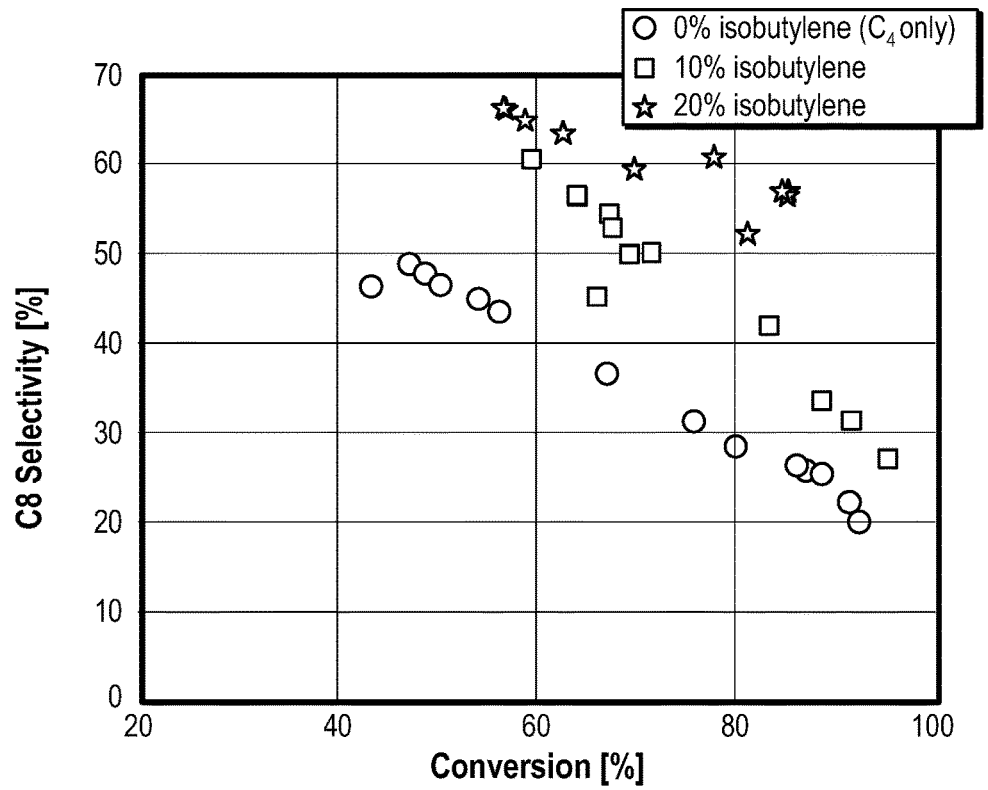
FIG. 14B is a graph of $C_8$ product selectivity as a function of 1-butene/isobutylene feed mixture conversion using Catalyst B over a range of WHSV values and at various ratios of 1-butene to isobutylene.
Figure 15:
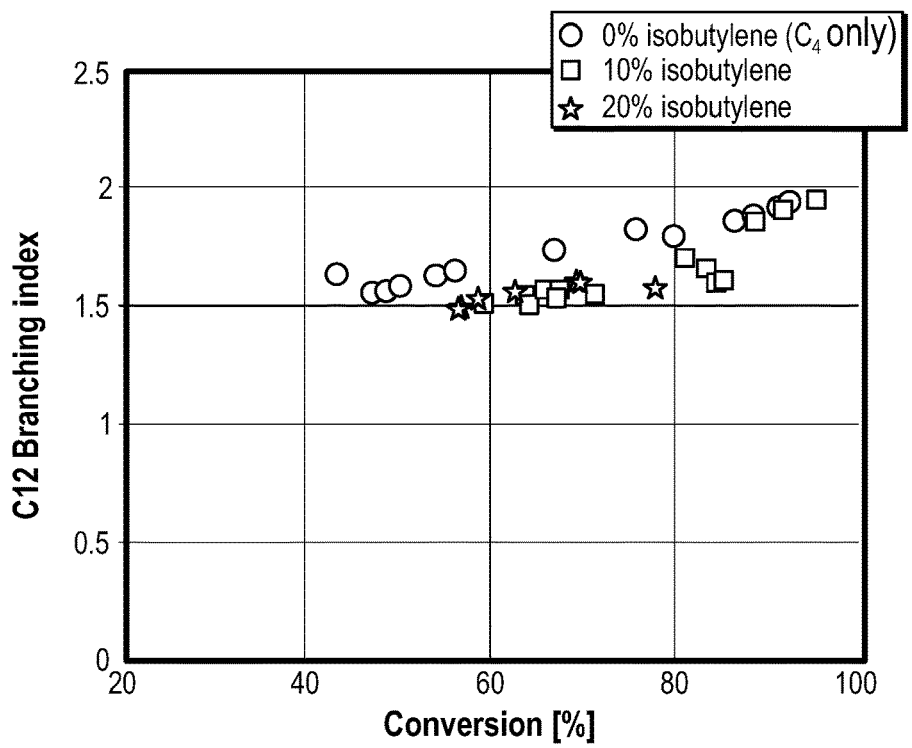
FIG. 15 is a graph of average branching index for $C_{12}$ olefin oligomers as a function of 1-butene/isobutylene feed mixture conversion using Catalyst B over a range of WHSV values and at various 1-butene/isobutylene feed mixture compositions.

Example 9: $C_8$ and $C_{12}$ Product Selectivity with Steamed ZSM-23 Catalyst and 1-butene/Isobutylene Feed Mixture Example 6 was repeated with 1-butene/isobutylene in various ratios as the feed mixture. The overall olefinicity of the feed mixture was again maintained at 50 wt % with a saturated hydrocarbon diluent. The saturated hydrocarbon diluent was butane in all instances. WHSV values in this example ranged from 20-60 hr$^{-1}$. FIG. 14A is a graph of $C_{12}$ product selectivity as a function of 1-butene/isobutylene feed mixture conversion using Catalyst B over a range of WHSV values and at various ratios of 1-butene to isobutylene. As shown in FIG. 14A, introduction of isobutylene to the feed mixture decreased the $C_{12}$ product selectivity, particularly at lower conversion percentages, and increased selectivity toward formation of $C_8$ olefin oligomers. FIG. 14B is a graph of $C_8$ product selectivity as a function of 1-butene/isobutylene feed mixture conversion using Catalyst B over a range of WHSV values and at various ratios of 1-butene to isobutylene. Without being bound by theory, the increased selectivity toward formation of $C_8$ product is believed to result from the tendency of isobutylene to undergo self-condensation rather than undergoing a reaction with 1-butene. FIG. 15 is a graph of average branching index for $C_{12}$ olefin oligomers as a function of 1-butene/isobutylene feed mixture conversion using Catalyst B over a range of WHSV values and at various 1-butene/isobutylene feed mixture compositions. As shown, the $C_{12}$ olefin oligomers that did form further surprisingly maintained average branching index values that were similar to (within experimental error) those obtained using a feed mixture comprising only a linear olefin (Example 6). The average branching index again trended lower at low conversion percentages and higher at high conversion percentages. The average branching index results suggest that isobutylene is not being significantly incorporated into the $C_{12}$ olefin oligomers, at least in its branched parent form, since for each isobutylene molecule incorporated, one branch is also introduced. The branching index behavior differs significantly from other olefin oligomerization catalysts for converting a feed mixture comprising isobutylene, which tend to afford highly branched oligomeric olefin products.

Example 10: Other Zeolites

The selectivity of other zeolite catalysts for producing $C_{10}$-$C_{13}$ olefin oligomers was evaluated under similar conditions to those described above. In each case, the feed mixture was a 1-butene:butane mixture having 50% olefinicity.

Figure 16:
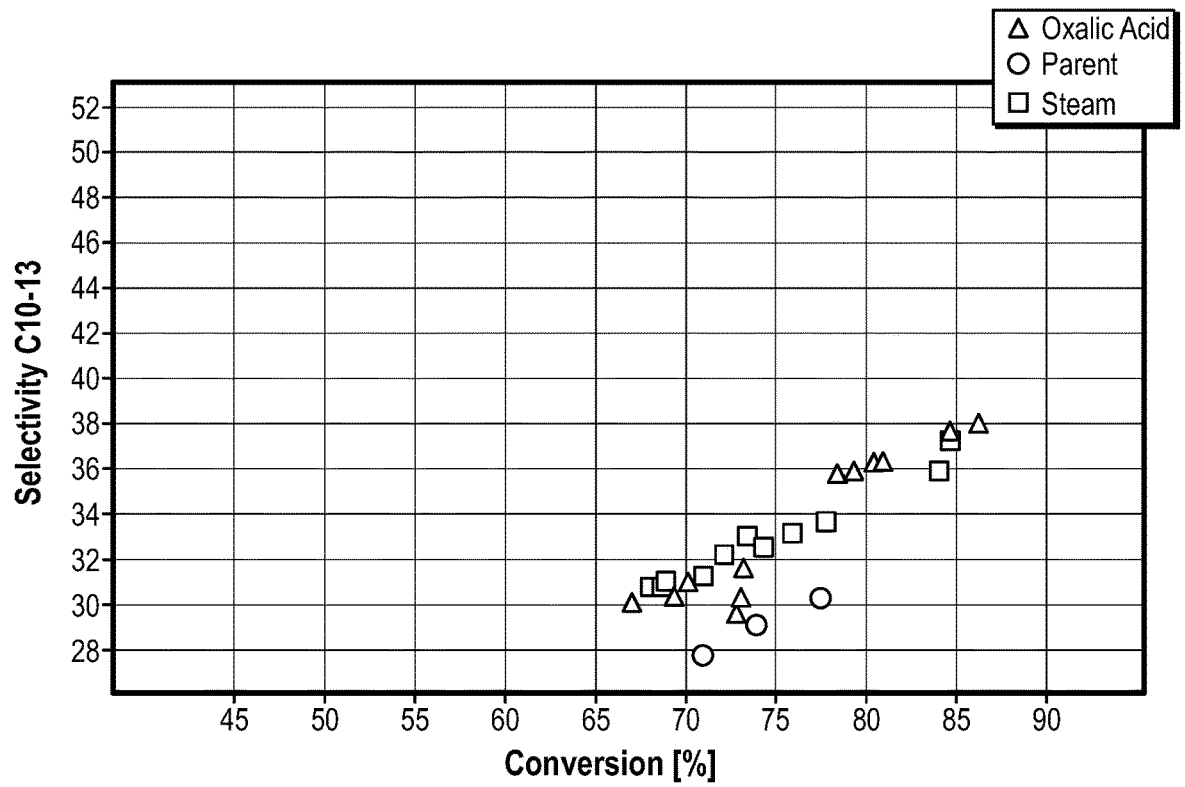
FIG. 16 is a graph showing selectivity for formation of $C_{10}$-$C_{13}$ olefin oligomers as a function of 1-butene feed mixture conversion using an MRE zeolite catalyst modified under various conditions.

FIG. 16 is a graph showing selectivity for formation of $C_{10}$-$C_{13}$ olefin oligomers as a function of 1-butene feed mixture conversion using an MRE zeolite catalyst modified under various conditions. As shown, both steaming and oxalic acid modifications increased the selectivity toward formation of $C_{10}$-$C_{13}$ olefin oligomers. Steaming was conducted at 600° F. (316° C.) for 24 hours.

Figure 17:
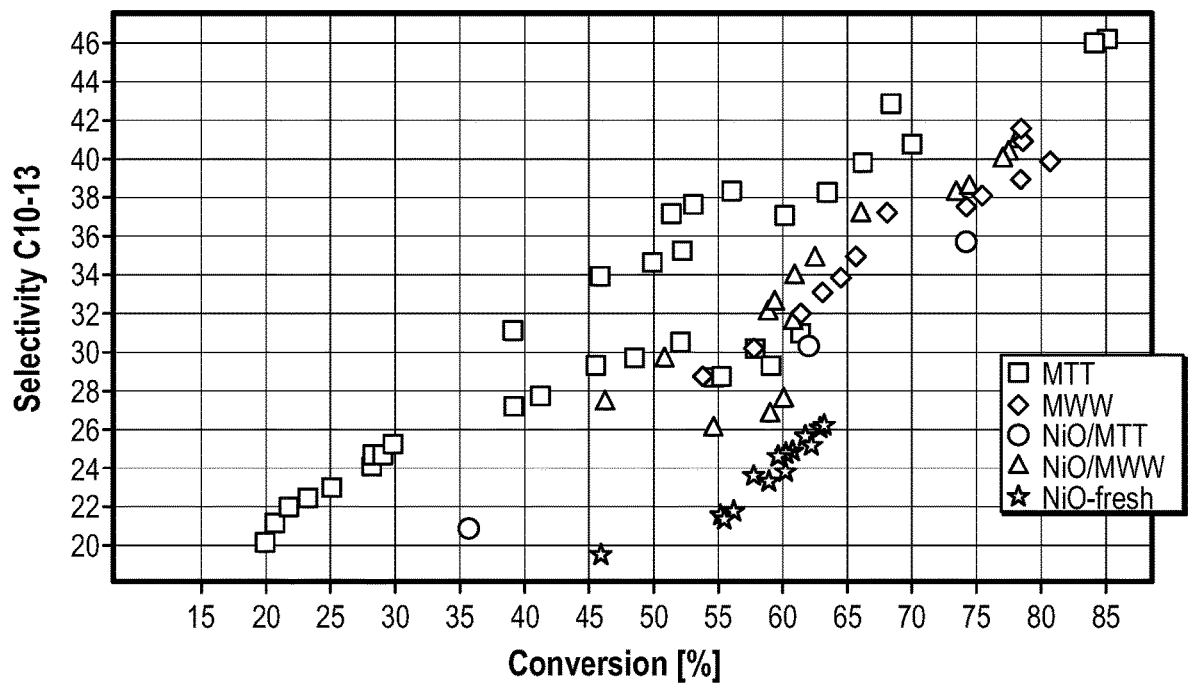
FIG. 17 is a graph showing selectivity for formation of $C_{10}$-$C_{13}$ olefin oligomers as a function of 1-butene feed mixture conversion using MTT and MWW zeolite catalysts impregnated with NiO.

FIG. 17 is a graph showing selectivity for formation of $C_{10}$-$C_{13}$ olefin oligomers as a function of 1-butene feed mixture conversion using MTT and MWW zeolite catalysts impregnated with NiO. As shown, NiO impregnated upon the zeolite catalysts afforded greater production of $C_{10}$-$C_{13}$ olefin oligomers than did NiO alone. NiO impregnation also altered the selectivity of the parent zeolite toward formation of C m-$C_{13}$ olefin oligomers.

Figure 18:
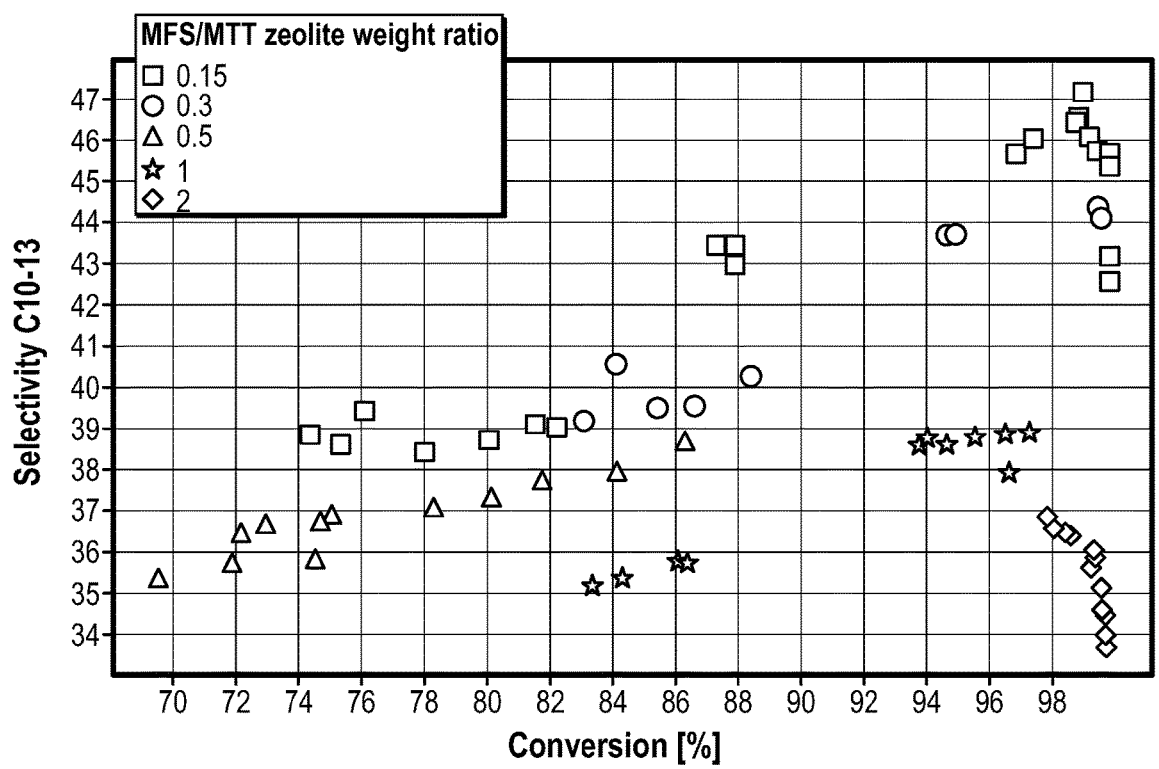
FIG. 18 is a graph showing selectivity for formation of $C_{10}$-$C_{13}$ olefin oligomers as a function of 1-butene feed mixture conversion using MTT and MFS zeolite catalysts in various ratios in a stacked bed arrangement

FIG. 18 is a graph showing selectivity for formation of $C_{10}$-$C_{13}$ olefin oligomers as a function of 1-butene feed mixture conversion using MTT and MFS zeolite catalysts in various ratios in a stacked bed arrangement Ratios in this figure are mass of MTT zeolite:mass of MFS zeolite. The feed mixture was contacted with the MFS zeolite catalyst first. As shown, the ratio of the two zeolites allowed tailoring of selectivity toward formation of $C_{10}$-$C_{13}$ olefin oligomers to be realized.

Example 11: Parallel Reactors

A $C_{12}$ olefin mixture was made over an MFS zeolite framework at a reaction temperature of 150° C.-350° C. at WHSV values of 5 $hr^{-1}$ to 20 $hr^{-1}$ using a $C_4$ feed mixture having an olefinicity of 50-80 wt. %. The $C_{12}$ olefin mixture made over the MFS catalyst was combined with $C_{12}$ olefins from Example 6 at a blending ratio of 1:1 by weight. The resulting mixture had a branching index of 2.05 by NMR and 1.8-1.9 by GC, and the average number of carbon atoms was 11.8 by GC-MS.

Example 12: Temperature and WHSV Variation

Figure 19:
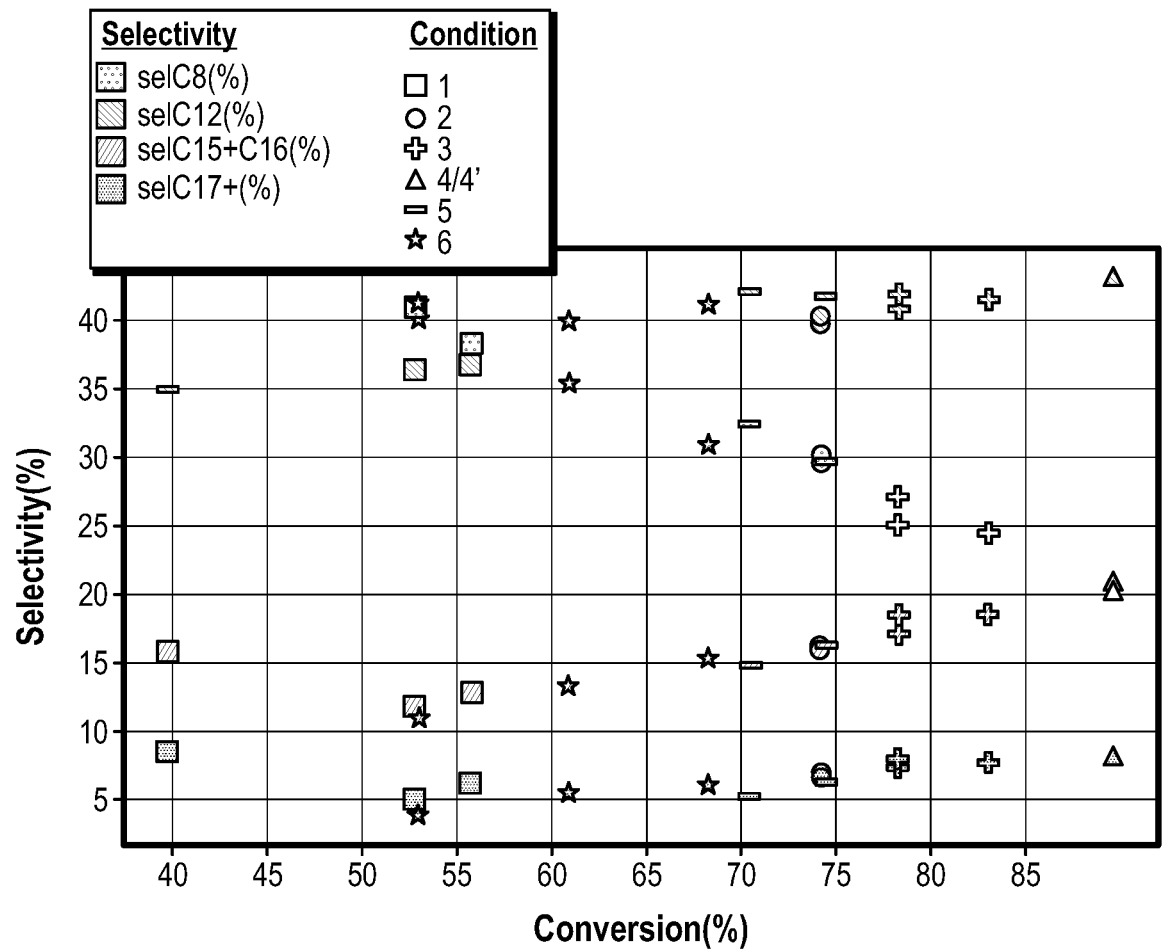
FIG. 19 is a plot of selectivity for various olefin oligomers as a function of feed mixture conversion under Conditions 1-6 in Example 12.

An olefinic feed mixture containing 1-butene, butane, and isobutane (50:40:10 mass ratio) was provided to a reactor containing steamed ZSM-23 catalyst particles (2-3 mm) (Catalyst B) at a starting WHSV of 9 $hr^{-1}$ at a temperature of 165° C. (Condition 1). The WHSV was held constant, and the temperature was ramped to 170, 175 and 185° C. (Conditions 2-4) with all other parameters being held constant. While holding the temperature constant at 185° C., the WHSV was then increased from 8 $hr^{-1}$ to 20 $hr^{-1}$ (Conditions 4'-6). The difference between Conditions 4 and 4' represents the variation in experimental flow rate. Selectivity and feed mixture conversion were determined under each set of conditions. FIG. 19 is a plot of selectivity for various olefin oligomers as a function of feed mixture conversion under Conditions 1-6 in Example 12. As shown, variation of WHSV and temperature was effective for controlling the product distribution. Moreover, there was high selectivity for production of $C_{12}$ olefin oligomers under the various reaction conditions, with the selectivity remaining relatively constant as the feed mixture conversion increased.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed, including the lower limit and upper limit. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

The invention claimed is:

1. A method comprising:
   contacting a feed mixture comprising at least one $C_3$ olefin and/or at least one $C_4$ olefin with a zeolite catalyst under oligomerization reaction conditions effective to form a product mixture comprising a plurality of olefin oligomers;
   wherein an average branching index of $C_{12}$ olefin oligomers and a selectivity for $C_{10}$-$C_{13}$ olefin oligomers within the plurality of olefin oligomers are correlated to one another as a function of percentage of conversion of the at least one $C_3$ olefin and/or the at least one $C_4$ olefin;
   specifying a targeted average branching index of $C_{12}$ olefin oligomers and/or a targeted selectivity for $C_{10}$-$C_{13}$ olefin oligomers; and
   selecting at least one of a weight hour space velocity (WHSV) and a temperature sufficient to achieve a percentage of conversion of the at least one $C_3$ olefin and/or the at least one $C_4$ olefin to afford the targeted average branching index of $C_{12}$ olefin oligomers and/or the targeted selectivity for $C_{10}$-$C_{13}$ olefin oligomers.

2. The method of claim 1, wherein the selectivity for $C_{10}$-$C_{13}$ olefin oligomers is about 30% to about 55%, based on total olefin oligomers by mass, and/or the $C_{12}$ olefin oligomers have an average branching index, as measured by GC, ranging from about 1.3 to about 2.0.

3. The method of claim 1, wherein the zeolite catalyst has an MTT framework or a TON framework.

4. The method of claim 1, wherein the zeolite catalyst comprises ZSM-23 crystallites or ZSM-23 crystallites defining a shaped catalyst body.

5. The method of claim 1, wherein the zeolite catalyst is modified by steaming, modified with an organic acid, modified with a transition metal, modified with coke, or any combination thereof.

6. The method of claim 5, wherein the organic acid is oxalic acid and the transition metal is yttrium.

7. The method of claim 1, wherein the feed mixture consists essentially of at least one linear butene and a saturated hydrocarbon diluent, or the feed mixture consists essentially of at least one linear butene, isobutylene and a saturated hydrocarbon diluent.

8. The method of claim 1, further comprising:
   separating a recycle stream from the product mixture, the recycle stream comprising at least one olefin oligomer; and
   reintroducing the recycle stream to the zeolite catalyst.

9. The method of claim 1, wherein the zeolite catalyst has a Si:$Al_2$ molar ratio of about 30:1 to about 200:1 and comprises about 0.1 wt. % to about 3.3 wt. % framework Al—O, the zeolite catalyst further comprising about 0.1 wt. % to about 5 wt. % transition metal.

10. A composition comprising:
    a plurality of olefin oligomers comprising at least $C_{12}$ olefin oligomers, the olefin oligomers
    a) comprising one or more oligomers having about 8 to about 24 carbon atoms and at least about 70 wt. % Type II and Type IV olefins in total;
       wherein an average number of methyl branches per carbon atom of the $C_{12}$ olefin oligomers ranges from about 0.08 to about 0.16; and/or
    b) comprising at least about 10% $C_{12}$ olefin oligomers, based on total olefin oligomers by mass, and at least about 25% $C_{10}$-$C_{13}$ olefin oligomers, based on total olefin oligomers by mass, and at least the $C_{12}$ olefin oligomers having an average branching index as measured by GC of about 2.0 or less.

11. The composition of claim 10, wherein at least a majority of the olefin oligomers are $C_{10}$-$C_{13}$ olefin oligomers, and at least $C_{12}$ olefin oligomers of the $C_{10}$-$C_{13}$ olefin oligomers have an average branching index, as measured by GC, ranging from about 1.3 to about 2.0.

12. The composition of claim 10, wherein the plurality of olefin oligomers comprises about 5 wt. % or less of $C_{10}$ olefin oligomers and about 5 wt. % or less of $C_{13}$ olefin oligomers.

13. The composition of claim 10, wherein the plurality of olefin oligomers has about 8 to about 16 carbon atoms, and the plurality of olefin oligomers comprises about 2 wt. % or less $C_{10}$ olefin oligomers and about 2 wt. % or less $C_{13}$ olefin oligomers.

14. The method of claim 1, wherein the zeolite catalyst comprises:
    ZSM-23 crystallites having a Si:$Al_2$ molar ratio above about 30 and an average crystallite size of about 0.1 microns or less;
    wherein the ZSM-23 crystallites or ZSM-23 crystallites defining a shaped catalyst body are modified by steaming, modified with an organic acid, modified with a transition metal, modified with coke, modified by NiO impregnation, or any combination thereof.

15. The method of claim 14, wherein the ZSM-23 crystallites have a Si:$Al_2$ molar ratio of about 30:1 to about 200:1 and comprise about 0.1 wt. % to about 3.3 wt. % framework Al—O, the ZSM-23 crystallites further comprising about 0.1 wt. % to about 5 wt. % transition metal.

16. The method of claim 15, wherein the zeolite catalyst further comprises a binder selected from the group consisting of silica, alumina, a metal oxide, titania, zirconia, silica-alumina, and any combination thereof.

17. The method of claim 14, wherein at least about 80% of the ZSM-23 crystallites have a crystallite size ranging from about 300 Å to about 800 Å.

* * * * *